United States Patent [19]
Keisling et al.

[11] Patent Number: 5,664,105
[45] Date of Patent: Sep. 2, 1997

[54] METHOD AND APPARATUS FOR NETWORK ANALYSIS

[75] Inventors: Mark D. Keisling, Monument; William R. Marbaker, Colorado Springs; Christopher A. Clabaugh, Woodland Park; Gordon A. Jensen, Colorado Springs, all of Colo.

[73] Assignee: Fluke Corporation, Everett, Wash.

[21] Appl. No.: 317,739

[22] Filed: Oct. 4, 1994

[51] Int. Cl.$^6$ .............................. G06F 11/28; G06F 11/30
[52] U.S. Cl. ........................... 395/200.54; 395/183.15; 370/252
[58] Field of Search ................... 395/200.11, 800, 395/200.17, 185.15, 200.4, 183.15, 183.13

[56] References Cited

U.S. PATENT DOCUMENTS

| | | | |
|---|---|---|---|
| 4,922,503 | 5/1990 | Leone | 370/85.13 |
| 4,945,532 | 7/1990 | Hald | 370/13 |
| 5,101,402 | 3/1992 | Chiu et al. | 370/17 |
| 5,299,193 | 3/1994 | Szczepanek | 370/85.1 |
| 5,301,303 | 4/1994 | Abraham et al. | 395/500 |
| 5,363,493 | 11/1994 | Unverrich | 395/325 |
| 5,365,509 | 11/1994 | Walsh | 370/13 |
| 5,383,178 | 1/1995 | Unverrich | 370/17 |
| 5,430,726 | 7/1995 | Moorwood et al. | 370/85.11 |
| 5,491,687 | 2/1996 | Christensen et al. | 370/17 |

FOREIGN PATENT DOCUMENTS

| | | |
|---|---|---|
| 0477448 | 4/1992 | European Pat. Off. . |
| WO91/16679 | 10/1991 | WIPO . |

OTHER PUBLICATIONS

S. Saunders, An Ethernet LAN Analyzer for Everyman, *Data Communications International*, vol. 19, No. 16, Dec. 1990, New York, U.S.A., pp. 117–118.

S. Basset, Workstation Analyzes and Simulates LANS, *Computer Design*, vol. 22, No. 13, Nov. 1983, Winchester, MA, U.S.A., pp. 36, 38.

Ron Flores et al, "Taking the Mystery Out of Protocol Analysis", Hewlet Packard Company, Jan. 1985, 3 pages.

*Primary Examiner*—Mehmet B. Geckil
*Attorney, Agent, or Firm*—Dellett and Walters

[57] ABSTRACT

A network analysis instrument employs a CPU, display and field programmable gate array circuitry to receive network data and detect various error conditions. Percent utilization is determined and information pertaining thereto is displayed to provide a user with information regarding network operating conditions. Ghosts are detected as well as collisions, jabber conditions and runt conditions.

15 Claims, 13 Drawing Sheets

METHOD AND APPARATUS FOR NETWORK ANALYSIS

This invention pertains to a method and apparatus for performing network analysis and more particularly to a method and apparatus for providing measurement and analysis of network collisions, ghosts and other related data traffic problems on an Ethernet local area network.

BACKGROUND OF THE INVENTION

In an Ethernet local area network environment, collisions are utilized to provide management of access to the network between stations. Thus, a carrier sense multiple access (CSMA). System is employed wherein stations observe the network for the presence of carrier before sending and if such carrier is present, the stations defer for a period of time after the carrier is no longer present on the network before beginning a transmission. However, because of propagation delay along the network, a given station can begin transmitting within a time window without being able to detect the start of transmissions of other stations on the network. Therefore, a collision can occur wherein the transmissions from the two stations interfere with each other. The Ethernet local area network uses collisions and "backoff" wherein stations that have participated in a collision will defer a random amount of time before attempting retransmission after a collision has occurred.

In order to effectively install and maintain a network, it is desirable to be able to observe the various type and frequencies of collisions to assist in analyzing for potential problems. If the number of collisions becomes excessive, network throughput can be degraded. FIG. 1 is a block diagram of a typical Ethernet employing two segments 10,12, wherein each segment is a maximum of 185 meters in length with a repeater 14 providing interconnection between two segments to effect data transmission therebetween. Each segment has a number of nodes or stations 16 thereon which send and receive traffic on the network. Each end of an Ethernet segment is terminated by a 50 ohm terminator 18 which provides a termination impedance equal to the characteristic impedance of the network cable. In accordance with prior art network analysis devices, collision and frame errors are individually counted wherein a collision may produce a count as a collision as well as a count as a frame error (since the collision likely resulted in errors in the particular frame or frames that were collided with). This multiple counting of the same error event can obscure pertinent information about the probable cause of collisions or errors, since a simple collision is likely to result in frame error counts which can confuse the network technician attempting to analyze and locate the problem.

The above example assumes a 10Base2 network. On a 10BaseT network, every link to a local repeater is itself a separate segment and terminates at the repeater and the local node, so most collisions would be classified as remote collisions unless the particular node is the colliding station.

Since collisions can rob a network of available bandwidth without any apparent symptoms to the casual user, it is desirable to provide a quantitative analysis of collisions as a percentage of the bandwidth available to enable the network technician to quickly analyze the situation.

The Ethernet and IEEE 802.3 specifications require that all frames on the network begin with a specific pattern known as a preamble and Frame Start Delimiter. Frames not meeting this requirement, referred to herewithin as "ghost" frames, are assumed to be fragments of collisions which are normal and insignificant and are therefore ignored by normally operating stations in accordance with the Ethernet specification. Network interface circuitry used by prior art local area network test equipment ignores such frames, since the Ethernet specification sets forth that such frames should be ignored by a receiving station. However, as the number of ghost frames becomes significant in terms of bandwidth consumption, large amounts of network bandwidth can be wasted without detection, robbing a network of bandwidth without any visible signs thereof. Ghost frame problems have been traditionally difficult to isolate and repair. Other problems can arise in a network wherein noise on the network (especially 60 Hertz noise) can also consume bandwidth just as collisions would as a result of network devices reacting to the noise. However, the potential impact of noise on users is far greater than that of collisions because the frequency of occurrence of noise could be far greater than the number of collision events would be.

Many forms of noise can exist on a network segment without noticeably hampering network throughput or functionality. Some types of noise will fool nodes on a network segment into thinking they are receiving a frame; all nodes will react differently, since there are no standards defining how or when a node should react to a noisy LAN segment. Grounding problems and noise problems are the most common sources of ghost frames. For example, ground loops and other wiring problems will cause some repeaters to believe that a frame is being received. Since the repeater is only reacting to an AC voltage riding on the cable, there will not be a valid frame to pass on to the other ports. The repeater however will transmit something on the other ports. This may either be a jam pattern or a very long preamble. Ghost events on a LAN do consume bandwidth and can slow a network down. Prior art network analyzers do not recognize such ghost events.

SUMMARY OF THE INVENTION

In accordance with the present invention, a network analysis apparatus and method are provided wherein network bandwidth consumed by collisions is measured and displayed as well as the occurrence and bandwidth consumption of ghost frames. Frames are classified into four types: local collisions, remote collisions, ghosts or other and both byte count and the number of frames of each particular type are determined and displayed. On a regular basis, the measurement information is retrieved by software and employed to calculate network percentage utilization as well as average utilization and occurrence of each type. The instrument suitably functions as a node on the network, sending and receiving data if desired, as well as a measurement instrument for analyzing data passing across the network.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
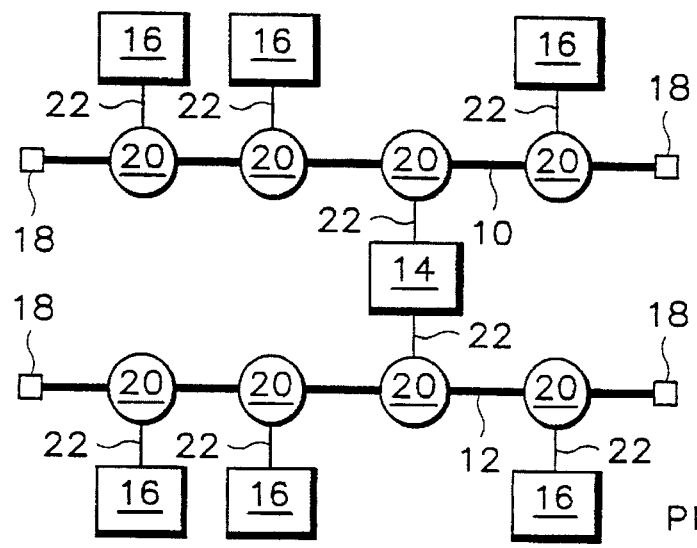
FIG. 1 is a block diagram of an Ethernet configuration in accordance with the prior art.
Figure 2:
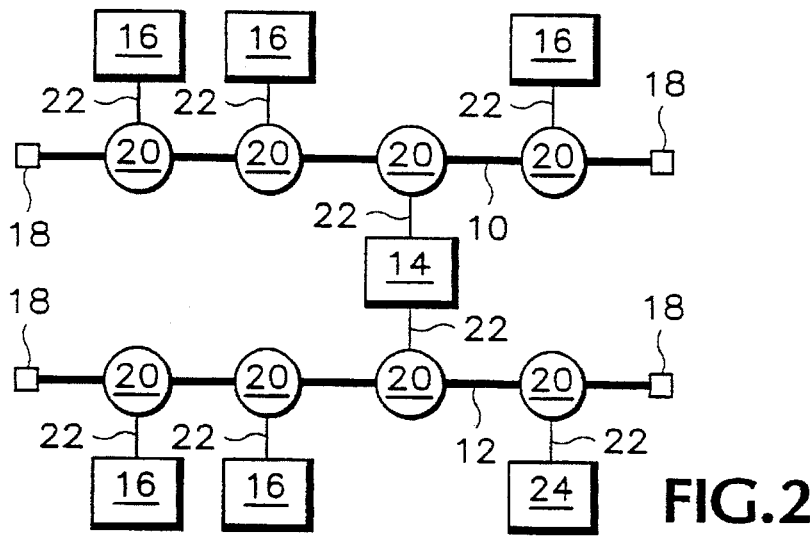
FIG. 2 is a block diagram of an Ethernet with an instrument in accordance with the present invention attached thereto.

Referring to FIG. 2, a block diagram of an Ethernet employing two segments with an instrument embodying the present invention attached thereto, the instrument 24 is suitably connected to cable tap 20.

Figure 3:
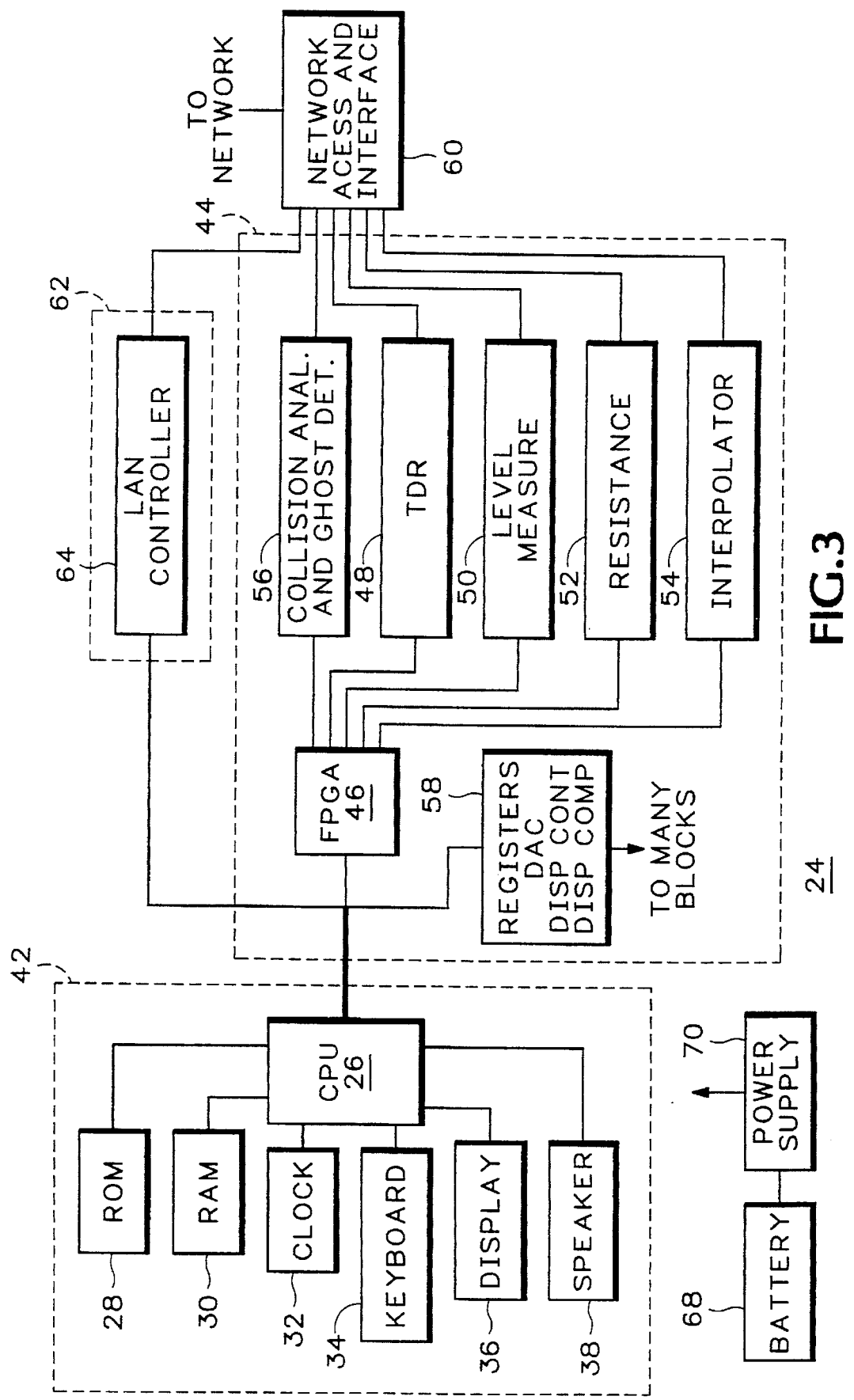
FIG. 3 is a block diagram of an instrument embodying the collision analysis and ghost detection apparatus and methods according to the present invention.

Referring now to FIG. 3, a block diagram of an instrument embodying the present invention, the instrument 24, a network analysis and measurement instrument, comprises a processor 26 (CPU) which interfaces with read only memory 28 (ROM) and random access memory 30 (RAM), real time clock 32, keyboard and indicators 34, display 36 and speaker 38. Keyboard and indicators 34, display 36 and speaker 38 suitably provide a user interface to enable information to be reported to and received from a user. The display and speaker provide visible and audible information to the user, while the keyboard and indicators both receive information from the user via key strokes and provide information to the user by, for example, illuminating indicator LEDs to provide status or event indication. In a particular embodiment, the indicators may comprise separate indicators to ascertain frame errors, collisions on an Ethernet, polarity problems, and activity indicators to denote the status of the network. The indicators may further comprise a utilization status, wherein the percentage of network utilization may be displayed to convey how busy the network is.

Referring further to FIG. 3, the CPU 26, ROM 28, RAM 30, clock 32, keyboard 34, display 36 and speaker 38 together comprise the processor sub-system 42. Measurement sub-system 44 is also provided and comprises a field programmable gate array 46 (FPGA) which is configurable to provide a series of analog measurements, including time-domain reflectometry system 48 (TDR), level measurement 50, DC resistance measurement 52 and interpolator 54 which is used in conjunction with TDR and other measurements. The FPGA is further configurable to provide collision analysis and ghost detection system 56 as discussed hereinbelow. The measurement sub-system 44 also includes block 58 which comprises control/data registers, digital-to-analog converter (DAC), display contrast control (DISP CONT) and display temperature compensation control (DISP COMP).

The measurement sub-system 44 is interconnected to the processor via the field programmable gate array 46. Block 58 is also accessible via a buffered byte bus to the processor 26.

The various measurement sub-system components 48, 50, 52, 54 and 56 connect to network access and interface block 60 which comprises an active T configuration to allow access to the network for performing tests and operations thereon. Another sub-system comprises the LAN controller block 64 which suitably comprises circuitry that emulates a TMS380C26 network controller card. The network interface can include various interface functions for the particular networks of interest, for example, Ethernet in the specific described embodiment, or Token-Ring.

The instrument is powered via battery 68/power supply 70. The battery block suitably comprises rechargeable batteries, for example nickel cadmium batteries, to enable multiple reuse cycles.

In accordance with the network analysis instrument of the present invention, collision analysis is provided to give a breakdown of collisions and ghosts occurring on the network. The types of errors and collisions that are observed in accordance with the preferred embodiment of the present invention are short frames, jabbers, ghosts, bad frame check sequence (FCS) and late collisions. Remote and local collisions are also observed.

A local collision is a result of two or more nodes transmitting at the same time on the segment being monitored (i.e., the segment to which the instrument 24 is currently connected). Excessive local collisions are most often caused by some type of problem with the physical media (cabling, etc.). A remote collision is one that occurs on a segment on the other side of a repeater. In accordance with prior art network analysis devices, collisions that occur during the preamble are not detected on remote segments, wherein the instrument in accordance with the present invention does not have this limitation and is therefore able to observe and count remote collisions that occur during the preamble. A late collision is a collision that occurs after the first 64 bytes of a frame. In certain network types, late collisions are observed as frames with a bad frame check sequence. Typical causes of late collisions are a faulty network interface card (NIC) or a network that is too long. A too long network is defined as a network wherein the end-to-end signal propagation time is greater than the minimum legal size frame (approximately 57.6 microseconds) as defined by the Ethernet specification. A short frame is a frame that is less than the minimum legal size (less than 64 bytes) but which has a good frame check sequence (FCS). The most likely cause of a short frame is a faulty network interface card or driver.

Jabber is a term applied to a frame that is greater than the maximum legal size (i.e., greater than 1518 bytes) either with a good frame check sequence or a bad frame check sequence. Typical causes of jabber are a faulty network interface card (NIC) or driver or problems with the network cabling. A bad frame check sequence frame is a legal size frame with a bad frame check sequence, which could be caused by a faulty NIC or driver, faulty cabling, a faulty hub or noise induced on the network. The term "ghost", as employed herewithin, refers to energy on the network cable that appears to be a frame but does not have a valid start delimiter. A ghost frame must be 72 or more bytes long or it is classified as a remote collision. Grounding and noise problems are the most common causes of ghost frames.

In accordance with the Ethernet specification, the start delimiter (or preamble) is a 64-bit pattern indicating the beginning of a frame's addressing information and comprises a series of alternating ones and zeros terminating with two "one" bits:

1010101010101010101010101010101010101010101010 101010101010101011

Many prior art protocol analyzers and network monitors identify certain events as runts. However, the term "runt" is not standardized and is interpreted differently by different product manufacturers. Accordingly the network analysis device of the present invention classifies those types of events which may typically have been called runts as either remote collisions or short frames. In accordance with the present invention, a remote collision is a frame of less than 64 bytes with a bad FCS, while a short frame is a frame of less than 64 bytes with a good FCS.

Figure 4:
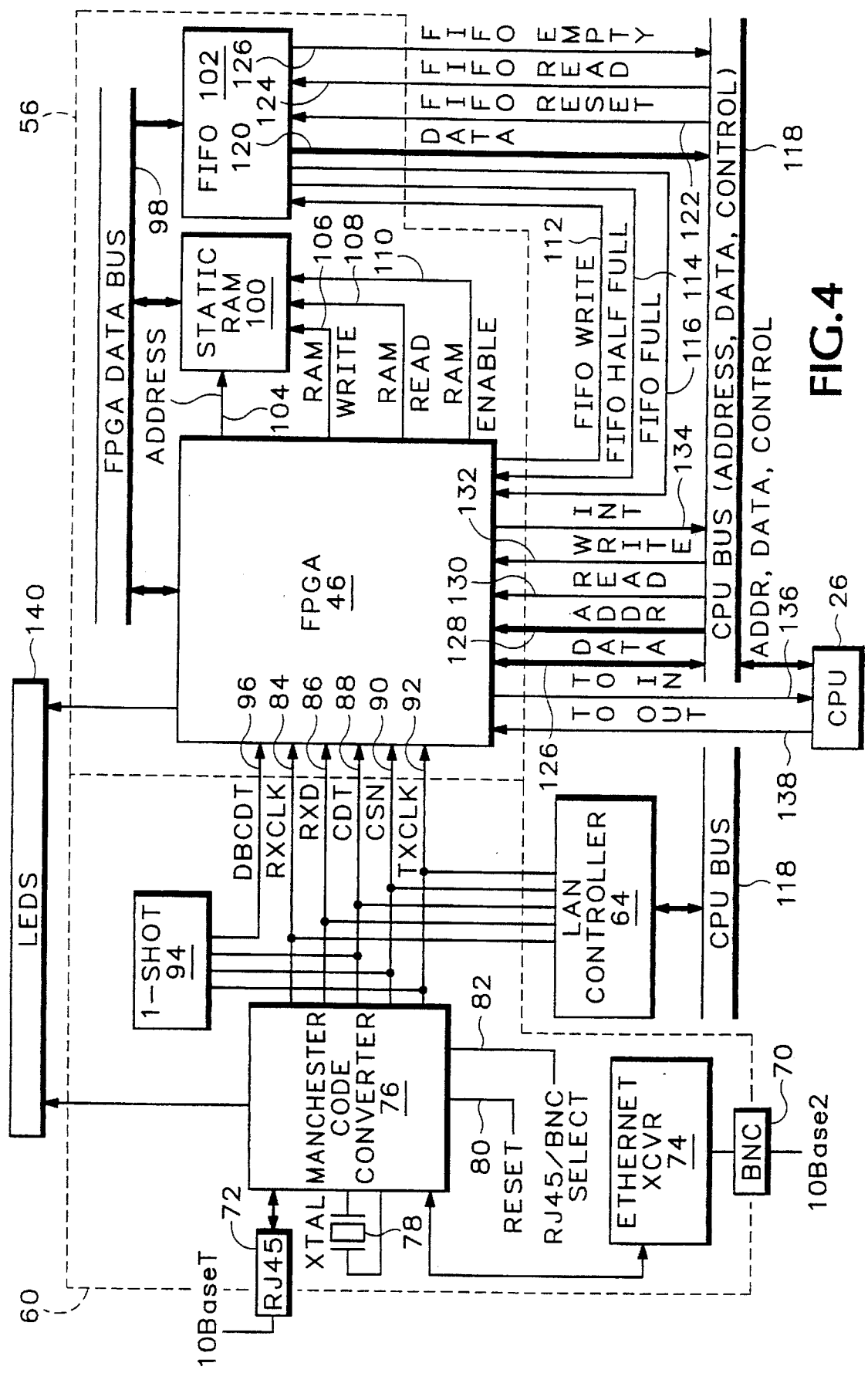
FIG. 4 is a block diagram illustrating the collision analysis and ghost detection block 55 in further detail, together with network access and interface 60 and LAN controller 64, illustrating the interconnection therebetween as well as the interconnections with CPU 26 of FIG. 3.

FIG. 4 is a more detailed block diagram of the ghost detection and collision analysis block 56 (FIG. 3) and related circuitry, illustrating in further detail the arrangement of the block and its interaction with the LAN controller 64, network access and interface 60 and CPU 26. Referring now to FIG. 4, the network access and interface block 60 receives network signals, either as a 10Base2 format signal via coaxial cable and BNC connector 70 or as a 10BaseT format network signal via RJ45 connector 72. These signals are supplied to the network access and interface block 60, wherein the 10Base2 signal received via the BNC connector 70 is supplied to an Ethernet transceiver 74 and the output thereof is provided to Manchester code converter 76. The 10BaseT signal via RJ45 connector 72 is supplied directly to the Manchester code converter 76. The timing for operation of the converter 76 is governed by the frequency of crystal 78 (XTAL). The code converter also receives a reset signal via line 80 and a select signal via line 82 for enabling selection between the RJ45/BNC connector (10BaseT/10Base2). The code converter generates a series of output signals, receive clock (RXCLK) via line 84, receive data (RXD) via line 86, collision detect (CDT) via line 88, carrier sense (CSN) via line 90 and transmit clock (TXCLK) via line 92. The collision detect (CDT), carrier sense (CSN) and transmit clock (TXCLK) signals are further provided to a one-shot circuit 94 which generates an output debounced collision detect signal (DBCDT) on line 96. The Ethernet transceiver 74, Manchester code converter 76 and one-shot 94 together comprise the network access and interface circuit 60 (FIG. 3). The receive clock (RXCLK), receive data (RXD), collision detect (CDT), carrier sense (CSN), transmit clock (TXCLK) and debounced collision detect (DBCDT) are supplied to the field programmable gate array 46 (FPGA). The FPGA interfaces with an FPGA data bus 98 which also interfaces with a static RAM 100. The data bus further interfaces with a FIFO memory 102 wherein the data bus is in a write only relation to the FIFO such that data is written from the bus to the FIFO. An address is supplied from the FPGA 46 to static RAM 100 via address bus 104. In addition, RAM WRITE, RAM READ and RAM ENABLE signals are provided to static RAM 100 via lines 106, 108 and 110 respectively. A FIFO WRITE signal is conveyed via line 112 from the FPGA to the FIFO memory 102 while the FIFO supplies two signals back to the FPGA, FIFO HALF FULL via line 114 and FIFO FULL via data line 116. The field programmable gate array 46, its data bus 98, static RAM 100, FIFO 102 and the various address and control signals mentioned hereinbefore together comprise the collision analysis and ghost detection block 56 as well as the FPGA block 46 of FIG. 3.

The collision analysis and ghost detection block 56 further interfaces with the CPU 26 via the CPU address, data and control bus 118. The FIFO memory 102 employs a data bus 120 for allowing read data from the FIFO to be transferred to the processor data bus. Control signals are provided from the processor data bus to the FIFO 102, comprising a FIFO reset signal on line 122 and a FIFO READ signal on line 124. The FIFO memory generates a FIFO EMPTY signal via line 126 to the processor bus. The FPGA 46 also interfaces with the processor bus 118, providing a read/write interchange of data via data lines 126 and addressing information supplied from the processor bus to the FPGA via address lines 128. FPGA WRITE and FPGA READ signals are also supplied to the FPGA via lines 130 and 132 respectively for controlling transfer of data from the processor to the FPGA, for example, for programming the FPGA. An interrupt signal, FPGA INTERRUPT, is driven via line 134 to the processor control bus from the FPGA. The processor also directly interfaces to the FPGA, receiving a timer zero input via line 136 from the FPGA and providing a timer zero output T0_OUT via line 138 back to the FPGA.

The LAN controller 64 also receives the various outputs of the Manchester code converter 76, receive clock (RXCLK), receive data (RXD), collision detect (CDT), carrier sense (CSN) and transmit clock (TXCLK). The LAN controller also interfaces with the processor address, data and control bus 118. The Manchester code converter 76 and field programmable gate array 46 both originate output signals to status LEDs 140 to provide event occurrence indication to a user of the instrument.

In a preferred embodiment of the present invention, Ethernet transceiver 74 comprises a 8392 Ethernet transceiver manufactured by Seeq Technology, Incorporated; Manchester code converter 76 comprises an 82503 dual serial transceiver, manufactured by Intel; field programmable gate array 46 comprises an X3042 manufactured by Xilinx and LAN controller 64 comprises a TMS38026 manufactured by Texas Instruments.

In operation, information is received via the 10Base2 or 10BaseT connectors, BNC 70 or RJ45 72. A select signal is asserted on line 82 to determine which of the two interfaces to the network is to be employed. If the BNC connector 70 is to be employed, the Ethernet transceiver 74 is further activated to provide the proper signals to the Manchester code converter 76. The Manchester code converter 76 is able to directly receive the 10BaseT RJ45 twisted pair signals via an isolation transformer (not shown) without requiring a transceiver as in the 10Base2 case. It should be noted that the Ethernet transceiver 74 in conjunction with the Manchester code converter 76 (or the Manchester code converter 76 alone in the 10BaseT case) is also suitable for transmitting data over the Ethernet.

From the incoming network data via either the BNC or RJ45 connectors, the Manchester code converter generates the receive clock signal, receive data, a collision detect signal, carrier sense and the transmit clock. The Manchester code converter thereby provides the Manchester encoding and decoding of data and supports transmission and reception of data frames that comply with the IEEE 802.3 standard. The Manchester code converter separates the receive clock and receive data from the incoming differential signal. Further, if a collision is detected, then the collision detect signal (CDT) is asserted. Whether the encoded data is to enter through the BNC connector 70 or the RJ45 connector 72 is determined prior to a measurement beginning, as chosen by the user of the instrument. The data entering through the BNC connector will have its voltage levels translated by the Ethernet transceiver 74. The transceiver 74 also determines if a local collision is occurring in 10Base2 networks and provides an indication of such to the Manchester code converter 76. This determination is made by observing the voltage level on the coaxial cable; if more than one station is transmitting at the same time, the average voltage on the network segment will be different than if only one station is transmitting. In 10BaseT applications, a local collision is indicated if the Manchester code converter 76 senses that a transmission is attempted (by the instrument) at the same time that converter 76 is receiving data from the network. The code converter further provides a transmit clock signal, but this clock is not related to the receive clock. The converter senses either a signal from the 10BaseT connection or from the Ethernet transceiver 74 and generates carrier sense (CSN) that indicates when the receive clock and receive data (RXCLK and RXD) are valid and provides an approximate boundary of an incoming frame of data.

Figure 5:
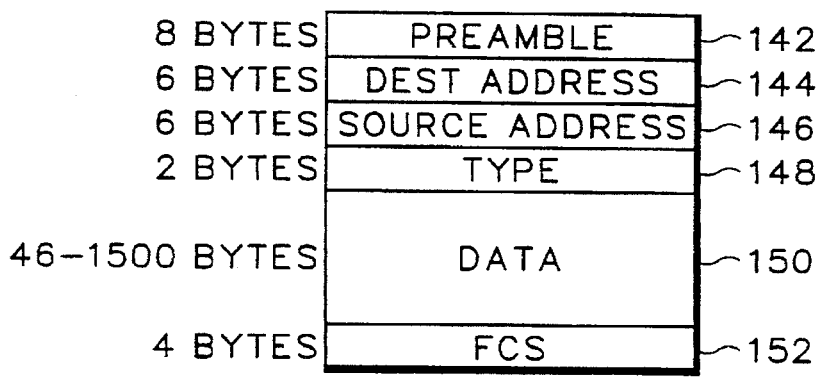
FIG. 5 is graphic representation of a typical format for an Ethernet packet in accordance with the prior art.

Referring now to FIG. 5, which is a diagrammatic representation of the format for an Ethernet frame, a typical frame will comprise an 8-byte preamble (64 bits) 142 followed by a 6-byte (48 bit) destination address 144. The destination address is then followed by the source address 146 (the address of the sender) which is 6-bytes (48 bits). A 2-byte type field 148 (16 bits) follows the source address whereupon a variable amount of data 150 of 46 to 1500-bytes length is provided. The frame concludes with a 4-byte (32 bit) frame check sequence 152 which is a 32-bit cyclic redundancy check (CRC) code, suitably used for error detection purposes.

Referring again to FIG. 4, the five signals supplied to the field programmable gate array 46 (RXCLK, RXD, CDT, CSN and TXCLK) are interpreted to determine what type of activity is present on the local area network (LAN). Static RAM 100 provides eight 16-bit counters, subdivided into four pairs, with one pair counting local collisions, a second pair counting remote collisions, a third pair counting ghosts and the fourth pair counting all other frame activity. Of each pair of counters, one counts the number of frames of that particular type that has been observed, while the other counter is employed to accumulate the length (in bytes) of the frames of that particular type, thus providing a count of the number of frames as well as the number of bytes of the particular frame type. Periodically (suitably twenty-five times a second) all eight counters are written to FIFO 102 for subsequent reading and interpretation by software which is operating on microprocessor 26 as described hereinbelow. The various control signals provided between the processor, the field programmable gate array and the RAM and FIFO enable measurements to stop should the software fall behind in emptying the FIFO and allow the FIFO to become full.

Figure 6:
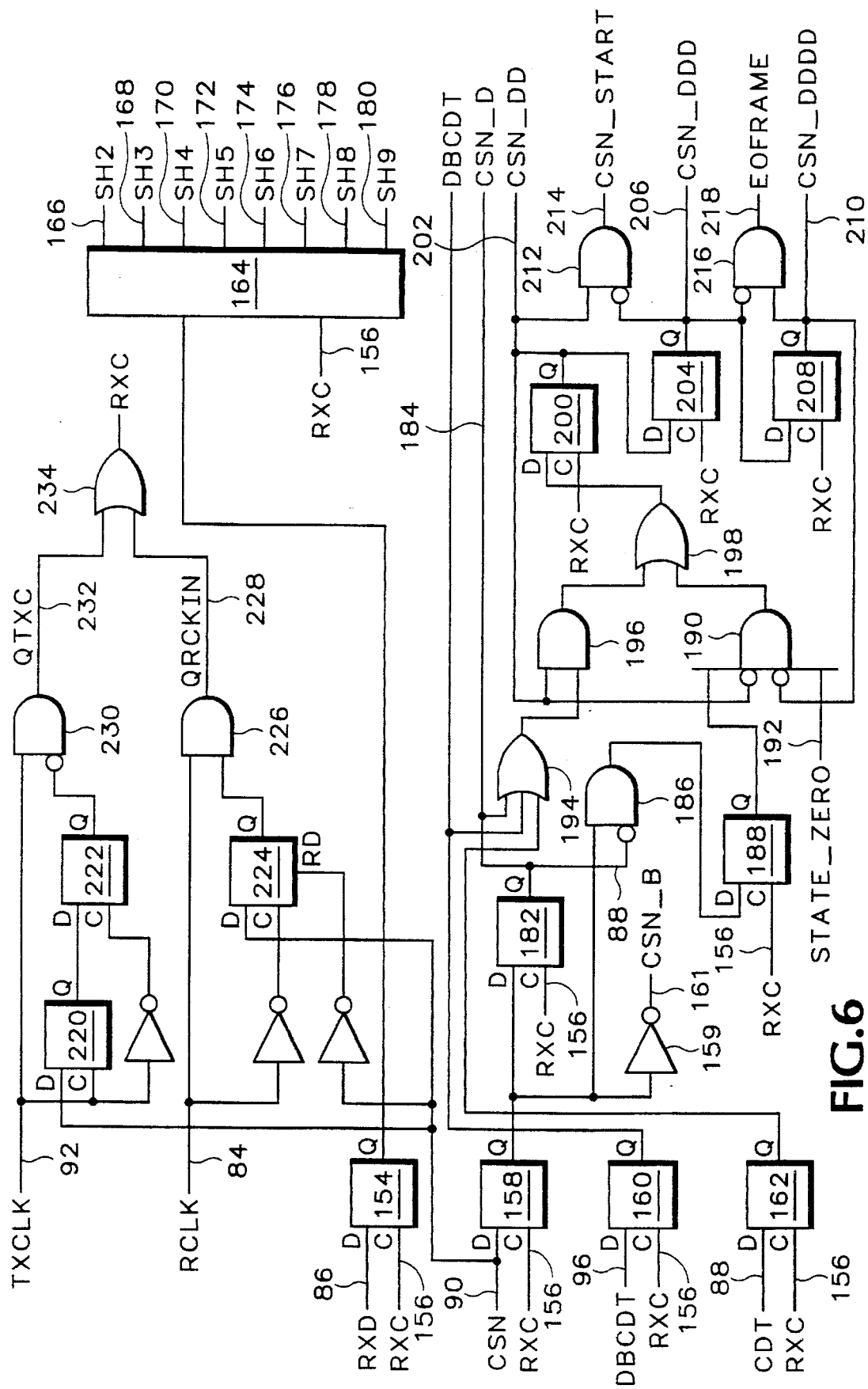
FIG. 6 is a diagram of a portion of the field programmable gate array configuration that implements portions of the collision analysis and ghost detection.

Referring now to FIG. 6, a diagram of a section of the field programmable gate array configuration that implements portions of the collision analysis and ghost detection of the present invention, the received data supplied to the FPGA from the Manchester code converter (FIG. 4) via line 86 is received by a flip-flop 154. The clock supplied to the flip-flop is a clock RXC 156 which is derived from the transmit and receive clocks supplied via lines 84 and 92 as discussed hereinbelow. The carrier sense signal CSN supplied via line 90 feeds a flip-flop 158, again clocked by RXC clock 156. The debounced collision detect DBCDT provided by one-shot 94 (FIG. 4) via line 96 comprises data input to flip-flop 160, again clocked by RXC 156. The collision detect signal CDT via line 88 is clocked into the FPGA via flip-flop 162 in accordance with clock RXC 156. Output of flip-flop 154, which comprises the received data, is supplied to a shift register 164, as clocked by RXC clock 156. Output from the shift register is provided as data lines SH2, SH3, SH4, SH5, SH6, SH7, SH8 and SH9, reference numerals 166–180, respectively. These various shifted input data bit signals are provided to other components as discussed hereinbelow with reference to FIG. 7.

Referring still to FIG. 6, the output of carrier sense flip-flop 158 is received by an inverter 159, generating an inverted output signal CSN_B 161. The output of flip-flop 158 is further conveyed to flip-flop 182 which again is clocked by RXC clock 156 and the output of this flip-flop becomes a delayed carrier sense signal CSN_D 184. The output of flip-flop 158 is also received by an AND gate 186 while the delayed carrier sense signal 184 (CSN_D) is inverted to supply the second input to AND gate 186. The output of AND gate 186 provides the data input to a flip-flop 188, clocked by RXC 156 and the output thereof is one input to four input AND 190, with a second input thereto being supplied by a STATE_0 signal 192 which is generated as discussed herein with reference to FIG. 11. The CSN_D signal 184 comprises a further input to a three input OR gate 194, the other two inputs thereto comprising the output of flip-flop 160 (the debounced collision detect DBCDT flip-flop) and the collision detect flip-flop 162 output. The output of OR gate 194 is supplied as an input to an AND gate 196 and the output of AND gate 196 and AND gate 190 comprise the two inputs to OR gate 198, the output thereof providing the data input to a flip-flop 200 which is clocked by RXC 156. The output of flip-flop 200 comprises a twice-delayed version of the CSN signal 90, designated CSN_DD 202 for twice-delayed carrier sense. This signal then becomes the second input to AND gate 196 and, when inverted, is supplied as a third input to four input AND 190. The CSN_DD signal is further provided to flip-flop 204 to produce CSN_DDD, the three-times delayed carrier sense signal 206, which is then still further conveyed to the data input line of flip-flop 208 for producing a four-times delayed carrier sense signal CSN_DDDD 210. Both flip-flops 204 and 208 are clocked by RXC 156. The twice-delayed carrier sense and three-times delayed carrier sense (CSN_DD 202 and CSN_DDD 206) become the inputs to an AND gate 212, with CSN_DDD being inverted. The output of the AND gate then comprises CSN_START 214 which indicates the start of carrier sense. The four-times delayed carrier sense signal 210 becomes an input to AND gate 216 while the three-times delayed carrier sense CSN_DDD 206 is inverted and then comprises the second input to AND gate 216. The output of the AND gate comprises the end-of-frame signal EOFRAME 218.

Thus, in operation, the internal carrier sense signal (delayed) CSN_D 184 is generated when CSN 90 is active.

The twice-delayed carrier sense signal CSN_DD 202 is generated by the system being in STATE_0 (wherein STATE_0 192 is asserted by the state machine of FIG. 11 as discussed hereinbelow) and by the various gates. When the twice-delayed carrier sense goes active but before the three-times delayed carrier sense becomes active, the input condition to AND gate 212 is satisfied such that CSN_START 214 goes high indicating that the start of carrier sense has been detected. In contrast, an end-of-frame is detected when the four-times delayed carrier sense CSN_DDD 210 is TRUE but the three-times delayed carrier sense CSN_DDD is not TRUE. Then the input conditions of AND gate 216 are satisfied generating the end-of-frame (EOFRAME) 218. Both CSN_START and EOFRAME are valid for one clock period and respectively indicate the start of a frame and the end of a frame. The complexity of the aforementioned circuitry is in order to accommodate an idiosyncrasy with the particular Manchester code converter 76 employed in the preferred embodiment wherein when a collision occurs, the converter 76 may pulse carrier sense (CSN 90) multiple times. However, carrier sense is employed to indicate the start and end of a frame, so the pulsing could be interpreted as multiple frames or multiple collisions. Therefore the aforementioned circuitry employs collision detect and debounced collision detect to interpret a collision as only a single collision. The STATE_0 signal further assists in this process. STATE_0 is TRUE whenever the system is not processing any frame data and is in an idle state. However, if frame data is being processed, then STATE_0 will not be TRUE and therefore AND gate 190 will not generate a true output and any pulses on the carrier sense will not be recognized, thereby filtering out extra pulses on the carrier sense during a collision but not interfering with normal frame reception.

As mentioned hereinabove, the global clock employed by the field programmable gate array (RXC 156) is derived from the transmit clock provided on line 92 (TXCLK) and the receive clock provided on line 84 (RXCLK). The transmit clock signal 92 provides clocking to a flip-flop 220 and, when inverted, further clocking to a flip-flop 222. The data input to flip-flop 220 is provided from carrier sense (CSN) 90, while the data input to flip-flop 222 is the output of flip-flop 220. The receive clock RXCLK 84 is inverted and provides clocking information to flip-flop 224, while the data input of flip-flop 224 is the carrier sense signal CSN 90. The reset line of flip-flop 224 receives an inverted version of carrier sense 90. The output of flip-flop 224 is supplied to AND gate 226, while a second leg of AND gate 226 receives RXCLK 84. The output of AND gate 226 comprises a qualified receive clock 228 (QRCKIN). The output from flip-flop 222 is inverted and coupled to an input of AND gate 230, while the second input of AND gate 230 comprises the transmit clock TXCLK 92, the output of AND gate 230 being denoted qualified transmit clock QTXC 232. Both QTXC 232 and QRCKIN 228 are provided as inputs to OR gate 234, the output thereof comprising RXC 156, the global clock for the collision analysis and ghost detection.

In operation, the clock derivation circuitry employs carrier sense 90 (CSN) to select whether transmit clock TXCLK 92 or receive clock RXCLK 84 are used as the global clock. When carrier sense (CSN) is false and no frames are coming in, then RXCLK 84 is stuck low, since the signal is derived from incoming data and therefore TXCLK, which is always running, is used as the input clock. However, if carrier sense is TRUE, then RXCLK is used as the clock. Transmit clock TXCLK 92 is not used exclusively because it is not synchronized to the incoming receive data stream. The above noted circuitry provides a smooth transition between the two clock sources.

Figure 7:
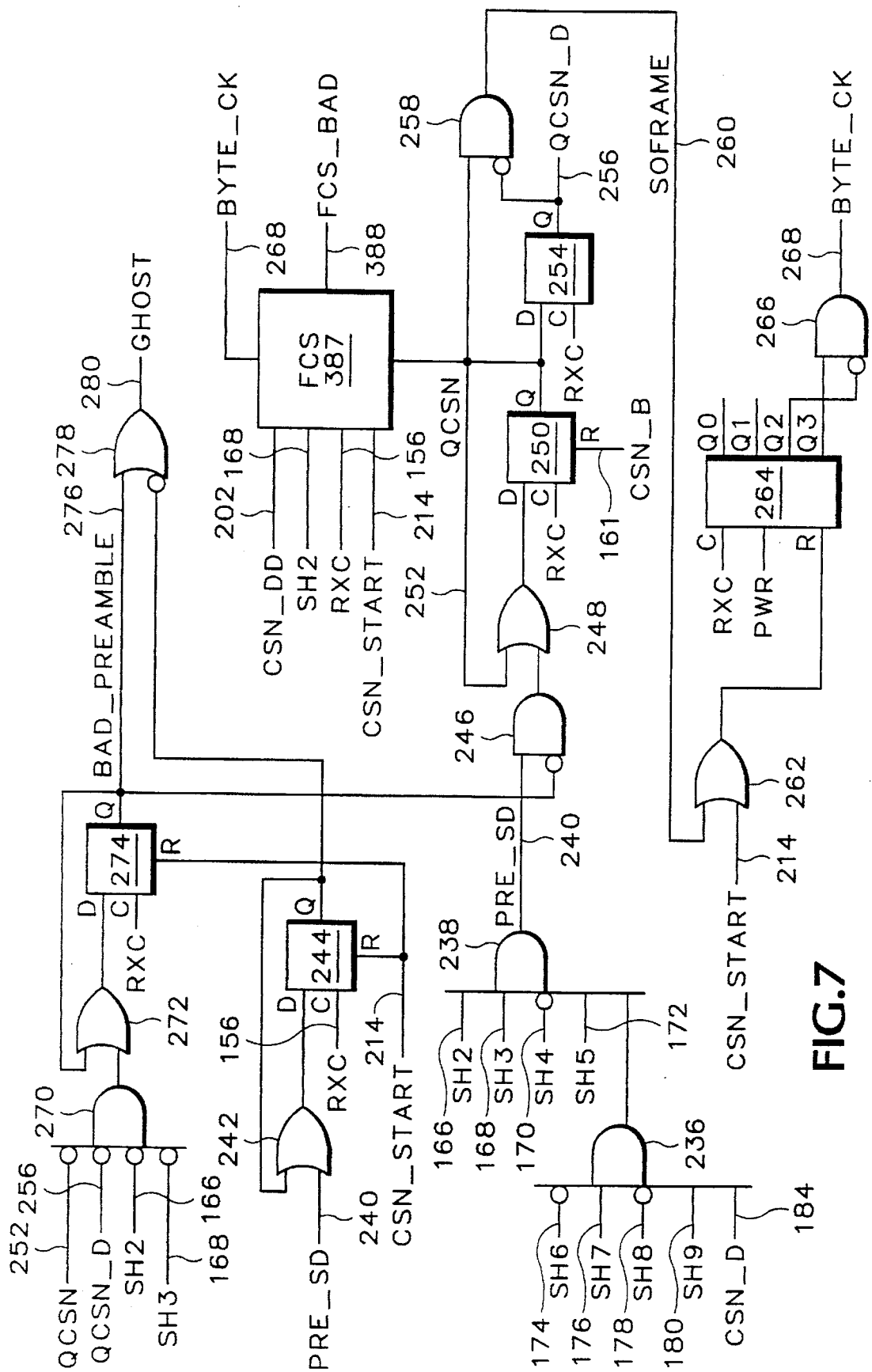
FIG. 7 is a diagram of a further portion of the field programmable gate array configuration for implementing further portions of the collision analysis and ghost detection method and apparatus in accordance with the present invention.

FIG. 7 is a diagram of the ghost detection and preamble detection circuitry as implemented in the field programmable gate array 46. The shifted input data is supplied to several AND gates and is interpreted to look for the appropriate bit sequence for a valid preamble. The shifted input data from shift register 164 is fed to AND gate 236, with the shifted data six (SH6) and shifted data eight (SH8) lines 174 and 178 respectively being inverted into the five input AND gate 236. The shifted data seven (SH7) 176 and shifted data nine (SH9) bits 180 are provided to the AND gate without being inverted. The delayed carrier sense CSN_D 184 also comprises an input to AND gate 236 while the output thereof is one of five inputs to AND gate 238. The other four inputs to AND gate 238 comprise SH2 166, SH3 168, SH4 170 (inverted) and SH5 172. The output of AND gate 238 comprises the preamble start delimiter signal PRE_SD 240 which indicates that the preamble start delimiter has been detected. The PRE_SD signal 240 becomes an input to OR gate 242, the output of the OR gate being a data input to flip-flop 244, with the second input of OR gate 242 comprising a feedback version of the output of flip-flop 244. Clocking to the flip-flop is supplied by RXC 156. The reset line of flip-flop 244 receives the CSN_START signal 214. The preamble start delimiter signal 240 (PRE_SD) is also provided as an input to AND gate 246, the output of the AND gate comprising an input to OR gate 248. OR gate 248 supplies the data input line of flip-flop 250, with clocking provided thereto via RXC 156 and the reset line of the flip-flop being connected the CSN_B signal 161 (FIG. 6). The output of flip-flop 250 comprises a qualified carrier sense signal 252 (QCSN) which is further fed back as the second input to OR gate 248. A flip-flop 254 receives the QCSN signal 252 as the data input thereto (clocking provided by RXC 156) while the output of flip-flop 254 (QCSN_D), a delayed qualified carrier sense 256, is provided as an inverted input to AND gate 258, the second input of the AND gate being the qualified carrier sense signal QCSN 252. The output of AND gate 258 comprises a start-of-frame signal SOFRAME 260 which is provided to an input leg of OR gate 262, the other input to the OR gate being supplied by the CSN_START signal 214, while the output of the OR gate comprises the reset input line to four bit Johnson counter 264. Clocking to the Johnson counter is supplied by RXC 156. The output legs Q2 and Q3 (the two highest output bits) of the Johnson counter are supplied as an inverted input and a normal input respectively to AND gate 266, the output of the AND gate comprising a BYTE_CK signal 268 which provides clocking of bytes, since the Johnson counter in conjunction with AND gate 266 will provide clocking of when eight data bits have been received or when eight bit times have passed.

The qualified carrier sense and delayed qualified carrier sense signals (QCSN and QCSN_D) are respectively provided as inverted inputs to AND gate 270, with third and fourth inputs to the AND gate comprising inverted representations of shifted bit signals SH2 166 and SH3 168. The output of AND gate 270 comprises a first input to OR gate 272, the output thereof comprising the data input to flip-flop 274. The output of the flip-flop provides a looped back input to the other leg of OR gate 272. Flip-flop 274 receives clocking via clock RXC and has its reset line tied to the CSN_START signal 214. The output of flip-flop 274 comprises a BAD_PREAMBLE signal 276 which is tied to a first input of OR gate 278 as well as to an inverted input of AND gate 246. OR gate 278 receives an inverted version of the output of flip-flop 244, the output of OR gate 278 comprising a GHOST signal 280.

The QCSN signal 252, as well as CSN_DD 202, shifted data bits SH2 168, clock RXC 156, CSN_START 214 and BYTE_CK 268 comprise inputs to frame check sequence (FCS) block 387, which generates output signal FCS_BAD 388. The frame check sequence block operates in accordance with the Ethernet specification to determine whether the frame check sequence generated from the received data matches the frame check sequence 152 (FIG. 5) transmitted along with the received data.

Figure 9:
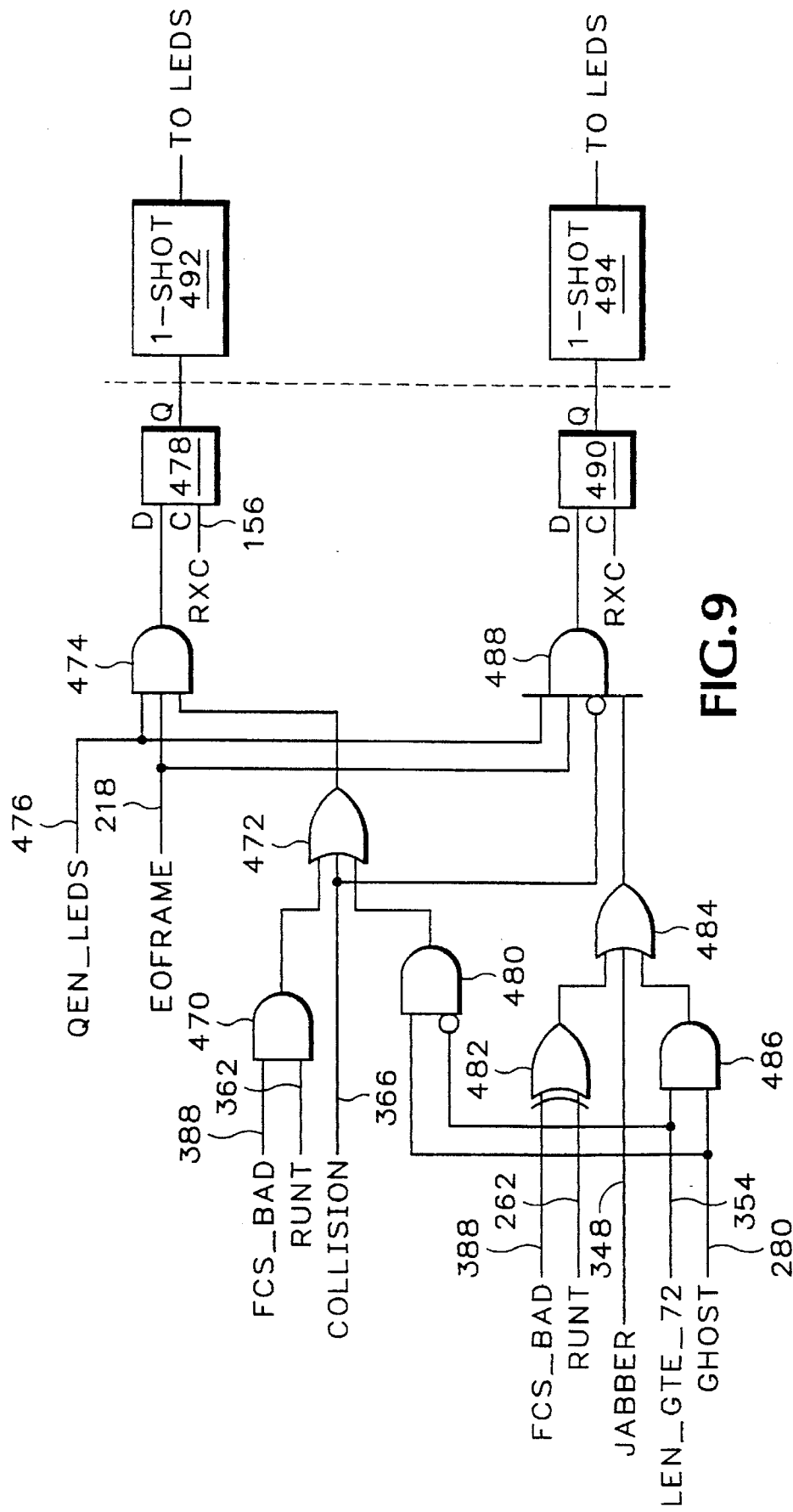
FIG. 9 is a circuit diagram of a portion of the configuration of the field programmable gate array employed in reporting error events to a user.

In operation, the circuitry of FIG. 7 observes incoming data looking for a valid preamble start delimiter. Accordingly, when the pattern 10101011 is detected as shifted data bits SH9 through SH2, the output of AND gate 238 will be TRUE, generating a true preamble start delimiter signal PRE_SD 240. This TRUE signal will then be provided to AND gate 246, and if the BAD_PREAMBLE signal 276 is FALSE, the output of AND gate 246 will go TRUE whereupon in appropriate time with the clocking signal RXC 156, the qualified carrier sense signal QCSN and the delayed version thereof, QCSN_D, will be generated as well as the start-of-frame signal SOFRAME. The start-of-frame signal SOFRAME 260 being TRUE will reset Johnson counter 264 which will restart the byte clocking counter. If the preamble start delimiter signal 240 becomes TRUE, then the input to flip-flop 244 is also TRUE whereupon the output goes TRUE which, when inverted, lowers the input to OR gate 278. Also, the BAD_PREAMBLE signal 276 is TRUE only if both SH2 166 and SH3 168 are zero bits and neither of the qualified carrier sense or the delayed qualified carrier sense are TRUE. Accordingly, bad preambles are sensed when the qualified carrier sense is not generated and two zero bits are detected. A valid preamble would not have two successive zero bits. Once the bad preamble signal is TRUE, then the input of BAD_PREAMBLE (inverted) into AND gate 246 ensures that qualified carrier sense cannot be generated. Therefore, one particular rule is that if a bad preamble is present, no qualified carrier sense will be generated. If a bad preamble is present or if no preamble start delimiter has been detected, the GHOST signal 280 is TRUE and, as will be noted hereinbelow with connection to FIG. 9, is employed to determine the presence of ghost frames.

Figure 8:
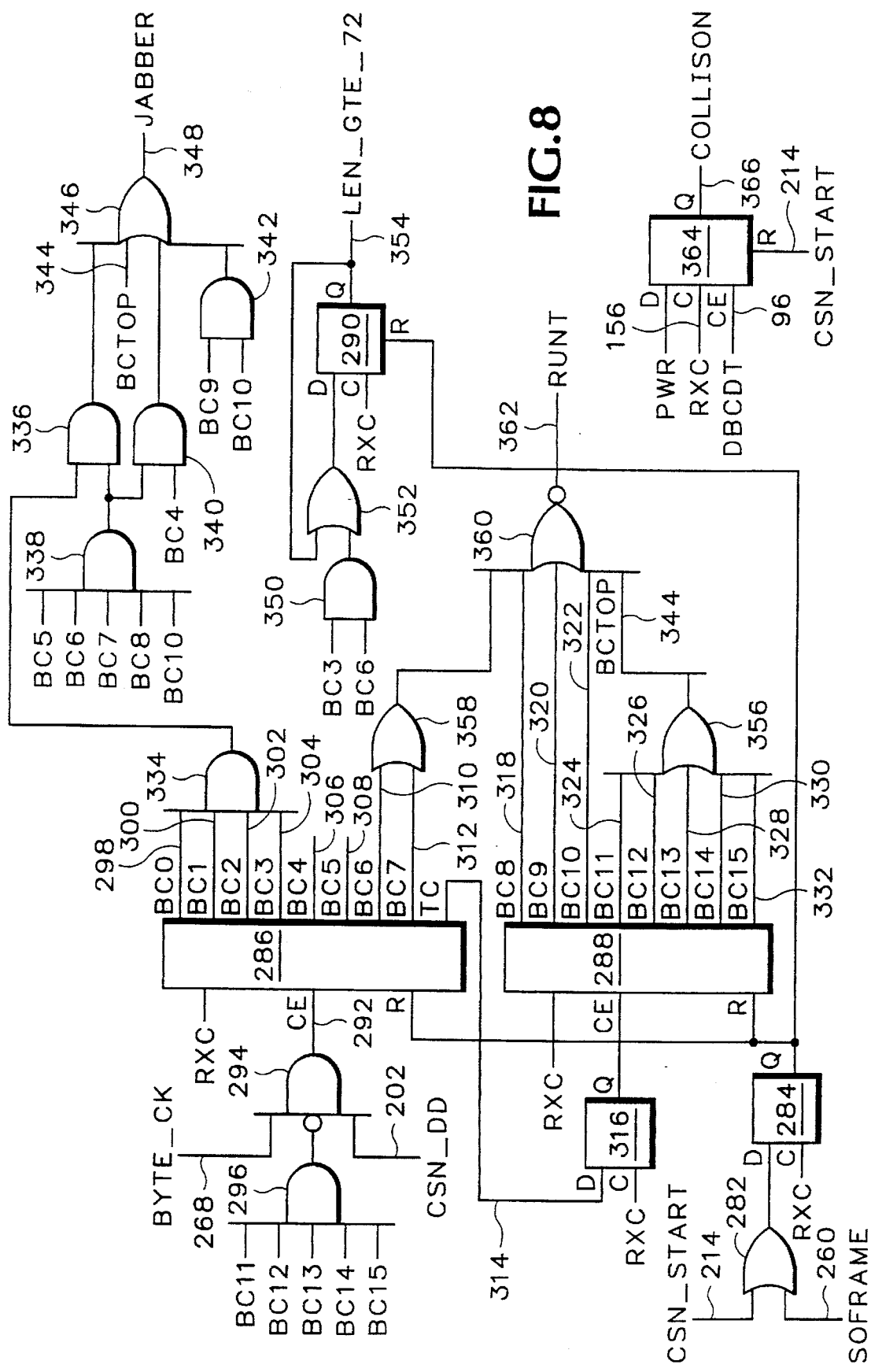
FIG. 8 is a diagram of a further portion of the field programmable gate array configuration for implementing a portion of the collision analysis and ghost detection method and apparatus of the present invention.

FIG. 8 is a diagram of a further portion of the field programmable gate array configuration implementing further portions of the collision analysis and ghost detection. In particular, the circuitry shown in FIG. 8 provides a byte counter functionality to count the number of bytes of data that appear over the received data line. To provide the byte counter functionality, the CSN_START signal 214 (generated by circuitry of FIG. 6) and the start-of-frame SOFRAME signal 260 (generated by the circuitry of FIG. 7) are provided as the inputs to OR gate 282, whereupon the output thereof is supplied as data input to flip-flop 284, wherein the flip-flop is clocked by the RXC clock 156. The output of flip-flop 284 is connected to a reset signal line of ripple counter 286, ripple counter 288 and flip-flop 290. Clocking to ripple counters 286 and 288 as well as flip-flop 290 is provided by RXC 156. The count enable input line of ripple counter 286 receives an enable length count signal 292 which is generated by the output of AND gate 294. The input to AND gate 294, a three input AND gate, comprises the twice delayed carrier sense CSN_DD 202 (generated by circuitry of FIG. 6) and the byte clock signal 268 BYTE_CK (generated by circuitry of FIG. 7). A third input to AND gate 294 comprises the inverted output of AND gate 296. The inputs to AND gate 296 are discussed hereinbelow. Ripple counter 286 generates nine outputs, which comprise byte count data lines and a carry signal BC0, BC1, BC2, BC3, BC4, BC5, BC6, BC7 and TC on data lines 298, 300, 302, 304, 306, 308, 310, 312 and 314 respectively. The carry signal TC 314 is further provided as the data input to flip-flop 316, clocked by RXC 156 and the output thereof comprises the chip enable line of ripple counter 288. Eight output lines of the ripple counter 288 are employed as further byte count signals BC8 (318), BC9 (320), BC10 (322), BC11 (324), BC12 (326), BC13 (328), BC14 (330) and BC15 (332). The signals BC0, BC1, BC2 and BC3 are provided as inputs to four input AND gate 334, the output thereof comprising an input to AND gate 336. The second input of AND gate 336 is provided by the output of AND gate 338, which employs as its inputs the data lines BC5, BC6, BC7, BC8 and BC10. The output of AND gate 338 is further provided as an input to AND gate 340, with the second input to AND gate 340 comprising the signal BC4. AND gate 342 receives the BC9 and BC10 signals and the output of AND gates 336, 342 and 340 as well as a signal BCTOP 344 generated as discussed hereinbelow are provided as inputs to four input OR gate 346, the jabber compare gate which produces as an output the JABBER signal 348. The signals BC3 and BC6 comprise two inputs to AND gate 350, the output of the AND gate being supplied as an input to OR gate 352 whereupon the output of the OR gate becomes the data input to flip-flop 290, the output of flip-flop 290 being fed back as the second input to OR gate 352. The output of flip-flop 290 comprises the length greater than or equal to 72-bytes signal 354 (LEN_GTE_72). The BC11, BC12, BC13, BC14 and BC15 signals are all provided as inputs to OR gate 356 and the output thereof comprises the BCTOP signal 344 first mentioned hereinabove in connection with OR gate 346. An OR gate 358 receives the BC6 and BC7 signals as input thereto and the output thereof together with the BC8 signal, the BC9 signal, the BC10 signal and the BCTOP signal are provided as inputs to five input NOR gate 360, which comprises the runt compare gate generating RUNT signal 362 as output. BC11, BC12, BC13, BC14 and BC15 are all provided as inputs to five input AND gate 296, and as mentioned hereinabove, the inverted output of AND gate 296 comprises an input to AND gate 294.

The above described components are operative to provide counting of bytes of data in order to enable counting and classification of collision types, other error types and the like. In operation, the condition of the start-of-frame SOFRAME signal or the carrier sense start CSN_START signal being active (as generated by the circuitry of FIG. 7 or FIG. 6) is clocked through flip-flop 284 to reset ripple counters 286, 288 and flip-flop 290. Accordingly, as the byte clock BYTE_CK signal 268 is toggled in accordance with the counting of the shifted-in data bits (from FIG. 7), the output of AND gate 294 will go TRUE, setting the enable length count signal 292 TRUE, whereupon ripple counter 286 will begin to count. With each cycle of the byte clock signal, the ripple counter will have a subsequent count value generated, with the carry signal thereof 314 being supplied further to ripple counter 288 to drive the count operation thereof. The various compare operations occur based on the byte counts wherein if any one of the signals BC6-BC15 are TRUE, the output of NOR gate 360 will be FALSE, indicating that the present frame is not a runt. In contrast, if all of BC6-BC15 are FALSE, then the current frame is classified as a runt, since any counts having more than the first six bits set (BC0-BC5) will be greater than sixty-three in length. Accordingly, a runt is internally classified as those frames of less than length sixty-four. It will also be appreciated that while counting begins once carrier sense start CSN_START is TRUE, the count will be reset once a valid frame delimiter has been detected and the start-of-frame signal is set TRUE, thereby providing count information for valid frames as well as for those frames which do not have a valid start delimiter. This reset is provided by OR gate 282 and the two input signals thereto. The jabber compare function determines whether more than 1518 bytes have been received. The various gates and inputs thereto accomplish this comparison, whereby if 1519 or more bytes have been counted, the JABBER signal 348 is set TRUE.

The length greater than or equal to 72 signal 354 LEN_GTE_72 is generated when bits three and six of the byte count are both TRUE, thereby causing the output of AND gate 350 to go TRUE, whereupon the output of flip-flop 290 goes TRUE and remains TRUE because of the fed back output thereof to OR gate 352. Thus, the length greater than or equal to 72 signal provides an indication that at least the minimum size frame has been received since, referring to FIG. 5, a valid Ethernet frame is a minimum of 72-bytes in length (8-bytes preamble, 6-bytes destination address, 6-bytes source address, 2-bytes type, minimum of 46-bytes data, and 4-bytes frame check sequence).

Referring again to AND gate 296, a five input AND gate, the inputs thereto comprise BC11, BC12, BC13, BC14 and BC15. Once these five count lines from ripple counter 288 are all TRUE, then the output of AND gate 296 becomes TRUE and when inverted, is supplied to AND gate 294 which lowers the count enable line of ripple counter 288 and effectively stops the further counting of bytes, since a count with BC11-BC15 enabled would be equal to 63,488.

In other circuitry illustrated in FIG. 8, the carrier sense start signal CSN_START 214 is provided further to the reset line of flip-flop 364, with clocking provided by RXC 156, the enable line of the flip-flop receiving the debounced collision detect signal 96 (DBCDT). The data line of flip-flop 364 is tied to a power source so as to always be true. The output of flip-flop 364 generates the collision signal 366. In operation, when CSN_START (generated by circuitry of FIG. 6) goes TRUE, flip-flop 364 is reset whereupon the collision signal is guaranteed to be low or false. Once the debounced collision detect DBCDT 96 becomes TRUE as a result of the output of one shot 94 (FIG. 4) being TRUE, the flip-flop is enabled whereupon the collision signal 366 goes high indicating that a collision has been detected.

Referring now to FIG. 9, a circuit diagram of a portion of the configuration of the field programmable gate array employed in reporting data errors to a user based on frame type determinations made in accordance with the circuitry of FIGS. 6-8, the FCS_BAD signal 388 and the RUNT signal 362 are supplied as inputs to AND gate 470, whereupon the output of the AND gate becomes one input to three input OR gate 472. The second input to OR gate 472 is the COLLISION signal 366, while the third input to the OR gate is the output of AND gate 480. AND gate 480 takes two inputs, an inverted version of the LEN_GTE_72 signal 354 and the GHOST signal 280. The output of OR gate 472 comprises one input to three input AND gate 474 with the other two inputs to the AND gate being the EOFRAME signal 218 and an LED enable signal QEN_LEDS 476. The output lead of AND gate 474 comprises the data input to flip-flop 478 (clocked by RXC 156) and the output from the flip-flop is supplied to a one-shot circuit 492 which is external of the FPGA. The one-shot generates an output signal for the status LEDs 140 (FIG. 4).

Other portions of the error indicator circuitry of FIG. 9 comprise exclusive-OR gate 482 which receives the FCS_BAD 388 and RUNT 362 signals as input, the output of the exclusive-OR gate comprising one of three inputs to OR gate 484. The JABBER signal 348 supplies the second input to OR gate 484, while the third input is derived from the output of AND gate 486, which receives the LEN_GTE_72 signal 354 and the GHOST signal 280 as inputs. The output leg of OR gate 484 provides one of four inputs to AND gate 488 wherein the remaining three inputs comprise the QEN_LEDS signal 476, the EOFRAME signal 218 and an inverted version of the COLLISION signal 366. A flip-flop 490, clocked by RXC 156, receives data input from the output of AND gate 488 and provides an output signal to a one-shot circuit 494 which is external of the FPGA. One-shot 494 generates an output signal for the status LEDs 140 (FIG. 4).

In operation, the circuitry of FIG. 9 drives two error status LEDs contained within status LEDs 140 of FIG. 4., with approximately one second duration of LED activation by one-shot 492 or 494 respectively. The QEN_LEDS signal 476 is activated if LED displays of errors are to occur and is active during normal operation of the instrument. The LEDS are masked off by disabling the QEN_LEDS signal when setting up the instrument so the LEDS do not erroneously light in response to the set-up operations. Accordingly, whenever an end of frame signal occurs (EOFRAME), and FCS_BAD is true and RUNT is true, or COLLISION is true or LEN_GTE_72 is false and GHOST is true, then one-shot 492 is activated, causing a first error LED to be lighted. If either one but not both of FCS_BAD and RUNT are true, or if JABBER is true or if LEN_GTE_72 and GHOST are true, the output of OR gate 484 is true, whereupon if COLLISION is not true (and LEDs are enabled and an end of frame condition has been detected) then one-shot 494 is activated which results in a second error LED in status LED bank 140 being activated. These two error LEDs thereby provide a user of the instrument with a quick visual indication of when errors are occurring on the network, with the first mentioned LED providing an indication that a collision (or collisions) has occurred and the second LED signaling that an error (or errors) has taken place.

Figure 10:
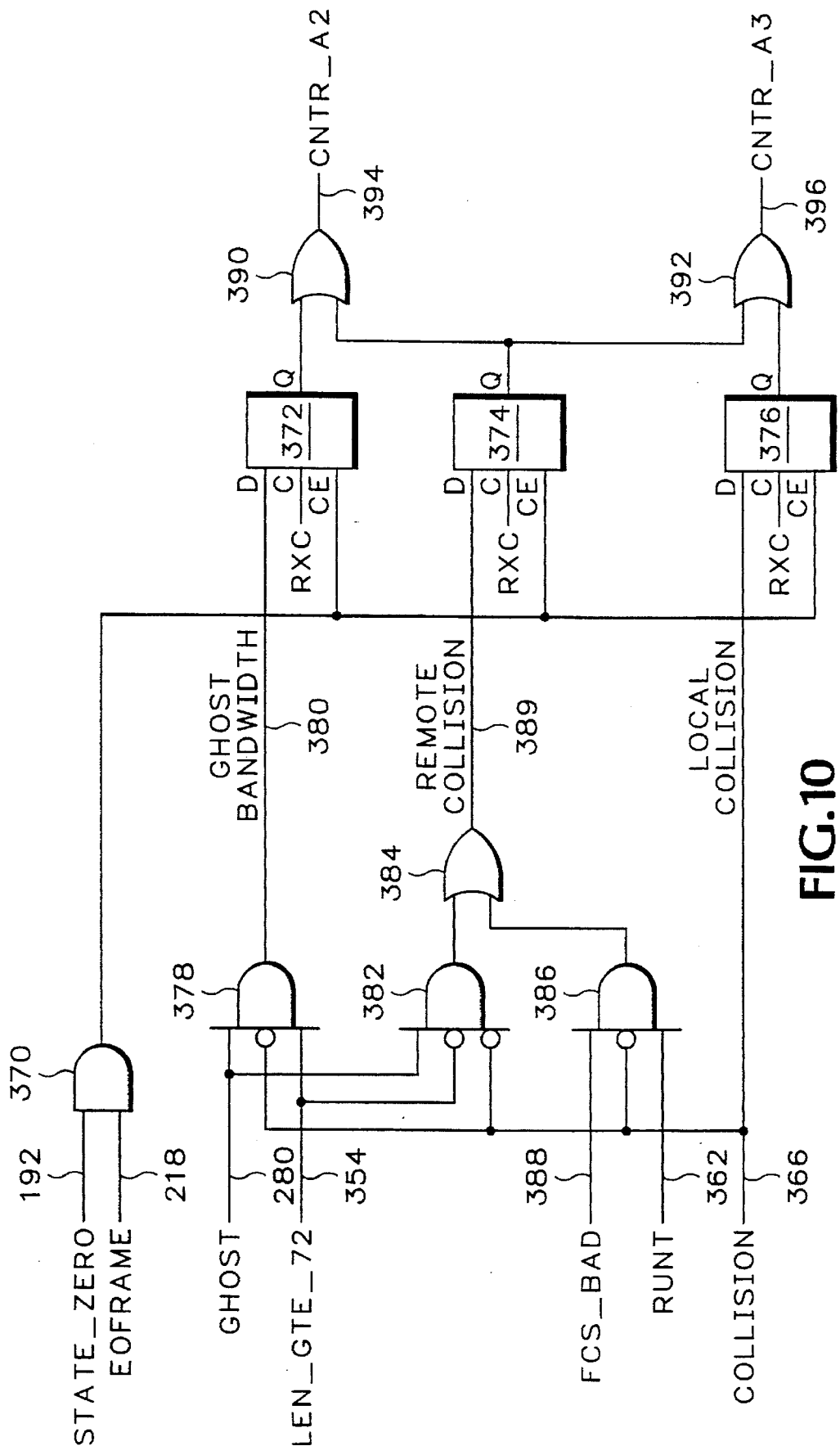
FIG. 10 is a further circuit diagram illustrating a portion of the configuration of the field programmable gate array implementing a portion of the addressing based on the frame type determination signals generated in FIGS. 7 and 8.

Referring now to FIG. 10, a diagram of the configuration employed with the field programmable gate array to properly classify the previously determined frame types and counts, the end-of-frame signal 218 and the STATE_0 signal 192 are supplied as inputs to AND gate 370, the output thereof providing the enable input to flip-flops 372, 374 and 376. The GHOST signal 280 (generated by circuitry of FIG. 7) and the length greater than or equal to seventy-two signal (LEN_GTE_72) 354 generated by circuitry of FIG. 8 provide two inputs to three input AND gate 378 while an inverted version of the collision signal 366 (generated by circuitry discussed hereinabove with reference to FIG. 8) provides the third input to AND gate 378, the output thereof being a ghost bandwidth signal 380 provided to the data input of flip-flop 372.

The GHOST signal 280, an inverted version of the length greater than or equal to seventy-two signal LEN_GTE_72 354, and an inverted version of the collision signal 366 are provided to AND gate 382, the output thereof comprising a first input to OR gate 384. The second input to OR gate 384 is generated by AND gate 386 which has three inputs, the FCS_BAD signal 388 (generated by a frame check sequence block 387 (FIG. 7) which determines whether the incoming data and the frame check sequence are appropriately matched), the RUNT signal 362 (generated the circuitry of FIG. 8) and an inverted version of the collision signal 366. The output of OR gate 384 comprises a remote collision 389 which comprises the data input to flip-flop 374.

Flip-flop 376 receives its data line input from the collision signal 366 which indicates a local collision. The output of flip-flop 372 comprises a first input to OR gate 390, the second input of OR gate 390 comprising the output of flip-flop 374. The output of flip-flop 374 also comprises a first input to OR gate 392, the second input being generated by the output of flip-flop 376. The outputs of the two OR gates 390 and 392, designated counter address two (CNTR_A2) 394 and counter address three (CNTR_A3) 396 comprise two bits of the addressing for static RAM 100 (FIG. 4) for proper storage of the byte count and frame count for each type of frame.

In operation, when an end-of-frame is detected, resulting in the assertion of the EOFRAME signal 218 and when the system is in STATE_0 (indicated by the assertion of STATE_0), the output of AND gate 370 is TRUE which results in flip-flops 372, 374 and 376 being enabled. At this time, the GHOST, length greater than or equal to seventy-two, frame sequence bad, RUNT and collision signals are appropriately gated through the AND and OR gate combinations and thereby generate the output counter address two and counter address three signals CNTR_A2 and CNTR_A3. These outputs are classified to provide addressing to static RAM 100 for appropriate storage of the byte counts and frame type counts. Table 1 illustrates the classification of frame type as a factor of the values CNTR_2 and CNTR_A3.

TABLE 1

| CNTR_A3 | CNTR_A2 | FRAME TYPE |
| --- | --- | --- |
| 0 | 0 | ALL OTHER FRAMES |
| 0 | 1 | GHOSTS |
| 1 | 0 | LOCAL COLLISIONS |
| 1 | 1 | REMOTE COLLISIONS |

From the observation of Table 1 and the circuitry of FIG. 10, it is seen that if the collision signal is not asserted and the frame check sequence is bad and the frame is less than 64 bytes, RUNT 362 is asserted and the frame check sequence is bad or the frame is a ghost and the length is not greater than or equal to seventy-two, then the remote collision signal 388 will be asserted generating a counter address two and counter address three output of 11, classifying the type as a remote collision. If, however, the collision signal 366 is asserted, then counter A3 is asserted but counter A2 is not and the frame is classified as a local collision. If none of the local collision signals is asserted or the appropriate signals are not asserted to generate the remote collision signal 388, but the GHOST signal 280 is asserted and the length greater than or equal to seventy-two signal 354 is asserted, then counter A2 is set but counter A3 is not and the frame data is classified as a ghost. In all other cases, neither counter A3 nor counter A2 will be set and the frame will be classified as an "other" type frame.

Figure 11:
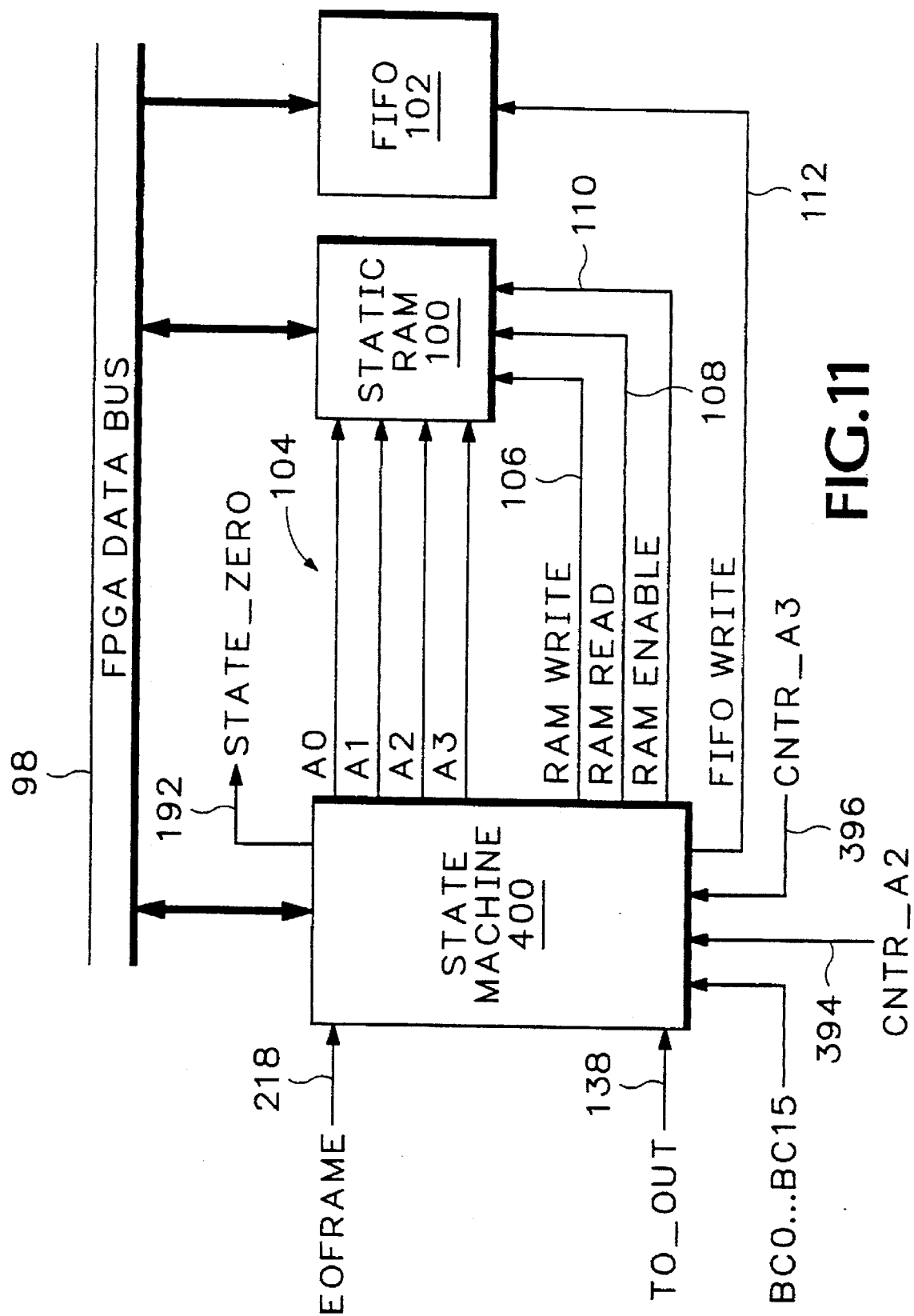
FIG. 11 is a block diagram of the addressing circuitry employed in accordance with the present invention to address the memory for storage of frame type counts and byte counts.

Referring now to FIG. 11, a block diagram of a portion of the apparatus according to the present invention illustrating the operation thereof in interpreting the determined frame data, the state machine block 400 is responsible for governing the operation of the actual counting and accumulating functions of the instrument. Block 400 receives the end-of-frame EOFRAME signal 218 (generated by the circuitry of FIG. 6) and generates a STATE_0 signal 192. The counter address two and counter address three signals (CNTR_A2 and CNTR_A3) 394 and 396 are also supplied to the state machine as well as the 16 bits from the byte counter circuitry described hereinabove with reference to FIG. 8, BC0–BC15.

The state machine interface with the FPGA data bus 98 and generates the 4 bits of address line 104 supplied to static RAM 100. The four address bits are denoted A0, A1, A2 and A3. The RAM WRITE 106, RAM READ 108 and RAM ENABLE signals 110 are also driven by the state machine, supplied to static RAM 100. As noted hereinabove with reference to FIG. 4, static RAM 100 also interfaces with the FPGA data bus 98 and the FIFO memory 102 is also connected to bus 98 for receiving data. The state machine 400 supplies the FIFO WRITE signal 112 to FIFO 102 for directing passing of data from the data bus to the FIFO. The operation of the state machine and RAM 100 and FIFO 102 are further discussed in conjunction with FIG. 12, which is a flow chart of the operation of state machine 400.

Figure 12:
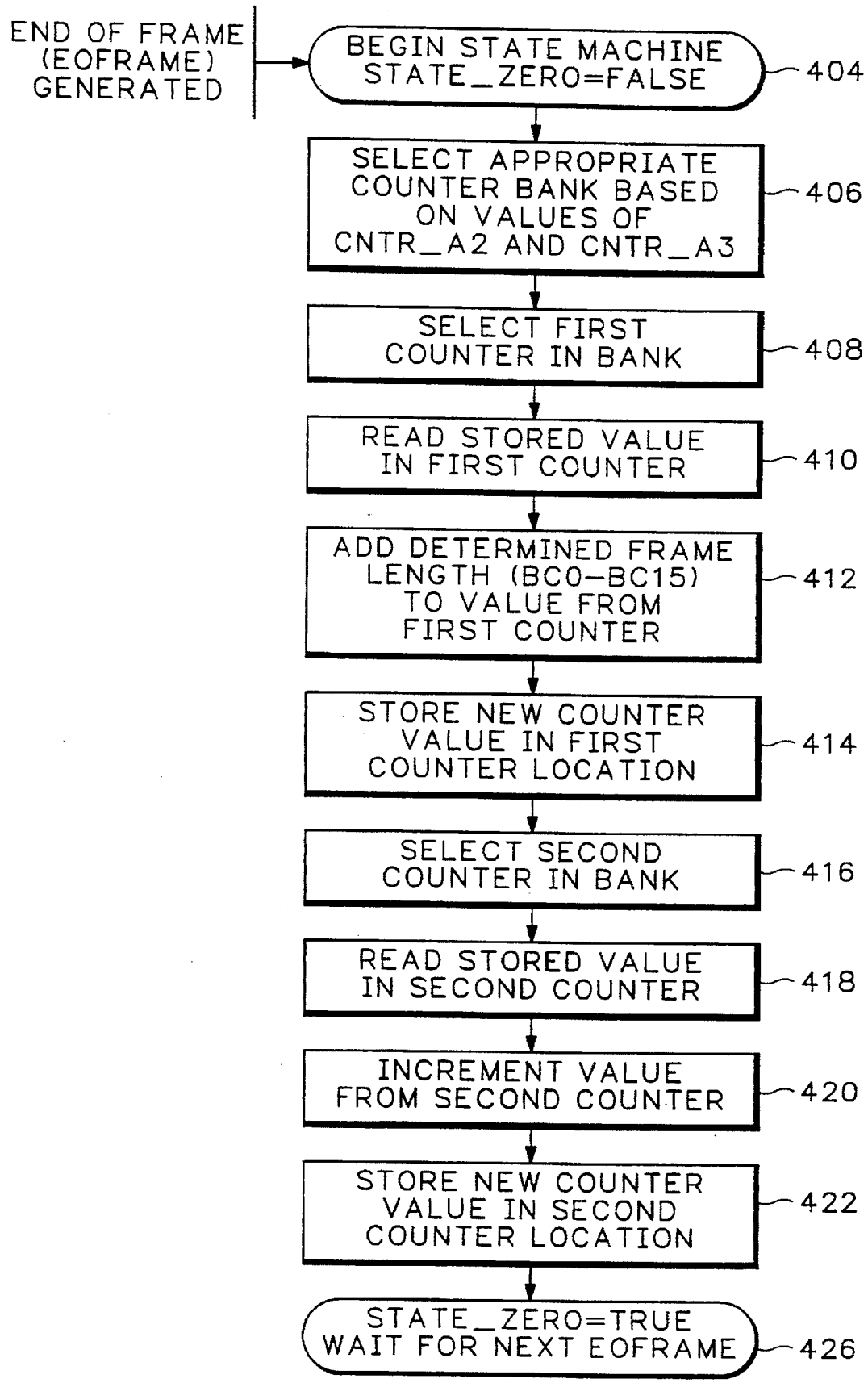
FIG. 12 is a flow chart illustrating the operation of the state machine of FIG. 11.

Referring now to FIG. 12, upon receipt of an end-of-frame signal EOFRAME 218 as generated by the circuitry discussed hereinabove with reference to FIG. 6, the state machine begins by setting the STATE_0 indicator 192 to be FALSE in step 404. This indicator is used by other circuitry as discussed hereinabove. Next, the appropriate counter bank of memory is selected based on the values of counter address two and counter address three bits 394 and 396 as generated in accordance with the circuitry of FIG. 10 (step 406). Having selected the appropriate counter bank, the first counter of this bank is then selected in step 408 by appropriate manipulation of the address zero and one bits A0 and A1. The CNTR_A2 and CNTR_A3 signals are used to supply the address two and address three bits on address bus 104 for access into static RAM 100. Having selected the appropriate bank, in step 410 the value stored in the first counter of this bank is read and in step 412 the frame length as determined by the byte counter circuitry of FIG. 8 is added to the value that has just been read, using the BC0–BC15 data bits (FIG. 8). Once the addition is complete, the newly accumulated value determined from the addition is stored back in the first counter location in step 414. Next, step 416, the second counter in the bank is selected, again by appropriate manipulation of the A0 and A1 data bits and the value stored therein is read from the static RAM 100 (via the FPGA data bus). This read value is incremented (step 420) and then stored back in the proper counter value location of RAM 100 (step 422). Finally, in step 426 the STATE_0 signal line is set to be TRUE (step 426) whereupon the state machine enters a wait state to wait for the next end-of-frame to be generated.

Figure 13A:
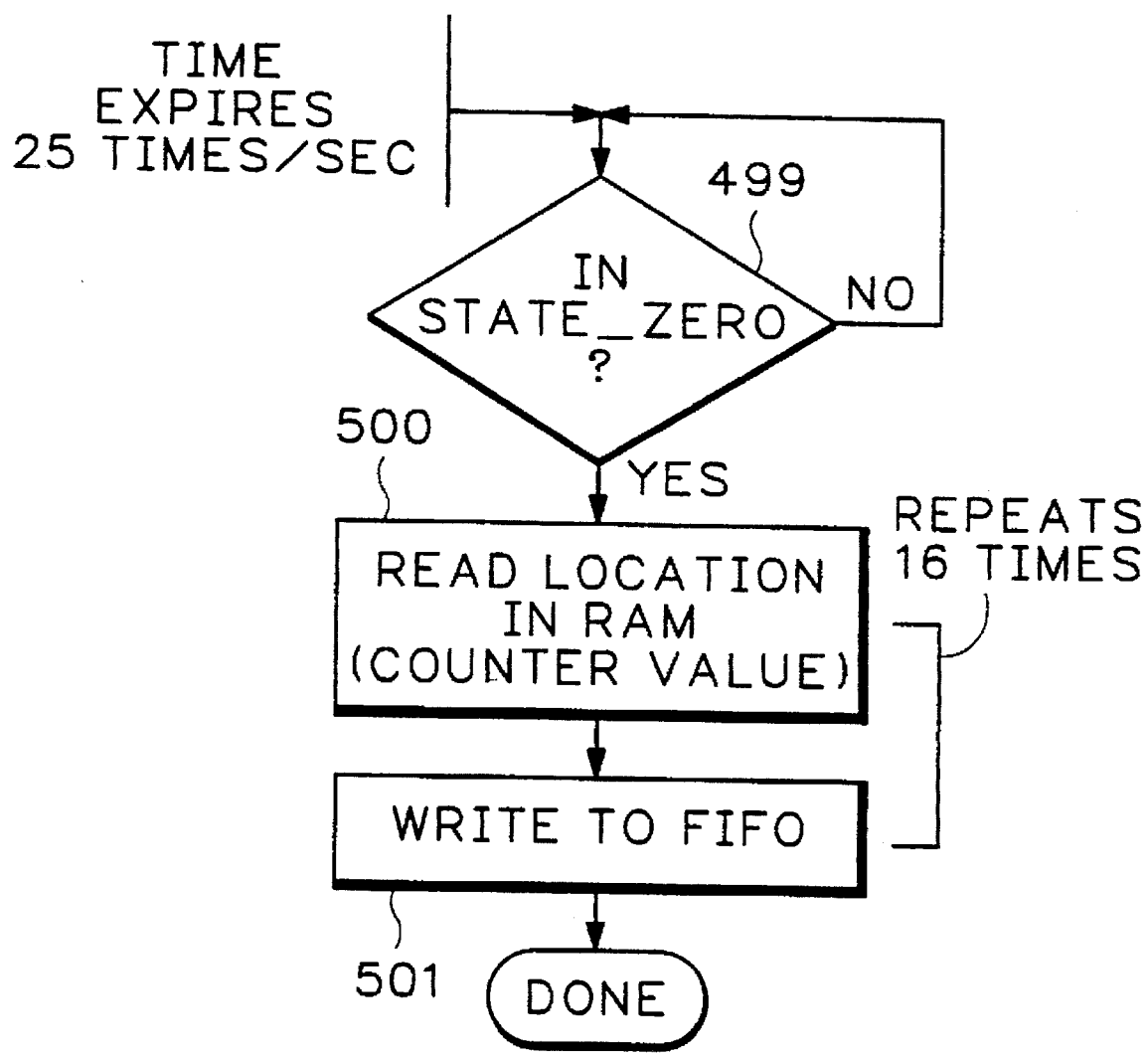
FIGS. 13A and 13B are flow charts of operational steps performed in storing measurement data and steps performed by software in interpreting measurement data, respectively.

Referring to FIG. 13A, a flow chart of the operational steps involved in storing counter data into the FIFO, every twenty-fifth of a second the T0_OUT line 138 pulses, instructing the state machine 400 to transfer the counts from the static RAM 100 to the FIFO 102. The state machine first waits until it is in state 0 (not processing a frame) (decision block 499) and then activates the RAM read line 108 (step 500) to read the counter value in the particular RAM location addressed by A0, A1, A2, and A3. Next, the FIFO write line 112 is activated to write the contents of the location to the FIFO 102 (step 501). The contents are transferred over the FPGA data bus 98. Steps 500 and 501 are executed a total of sixteen times, incrementing through the sixteen RAM locations addressed by A0, A1, A2, and A3. These are the 8 counter values described above.

Accordingly, the frame accumulation and count data is continually supplied to FIFO 102 whereupon it may be retrieved in accordance with a program running on processor 26 (FIG. 4) as discussed hereinbelow. The retrieved values may then be displayed or further manipulated as desired. In a particular embodiment, the information is used to provide an analysis display showing the type of errors or other frames as a percentage of total utilization of the network time. These values may be displayed as total number of bytes or frames, percentages, or in bar chart format, for example.

The collision analysis measurement provides information about how much bandwidth is consumed on the network by local collisions, remote collisions and ghosts, as well as the total bandwidth consumed by all traffic as a percentage of total bandwidth available (percent utilization). The number of frames that are local collision, remote collisions and ghosts and the number of frames per second is also shown.

This measurement is accomplished by looking at each frame that comes across the network (no frames are missed) and measuring the frame's length and then categorizing the frame as a local collision, remote collision, ghost or other, as performed by the circuitry of FIGS. 6–10 discussed hereinabove. Each category keeps track of the number of frames of that type (count) and also accumulates the total length in bytes (bandwidth).

Software that runs on CPU 26 (FIG. 4) employs the type counts and bandwidth counts stored in FIFO 102 (FIG. 4) to determine the percent utilization of each category of classification (e.g. local collisions, remote collisions, ghosts, other). In operation the software and CPU 26 in conjunction assert the FIFO read signal 124 (FIG. 4) and receive the data from the FIFO on data line 120. The various count data stored in the FIFO are then processed by the software as discussed hereinbelow.

Figure 13B:
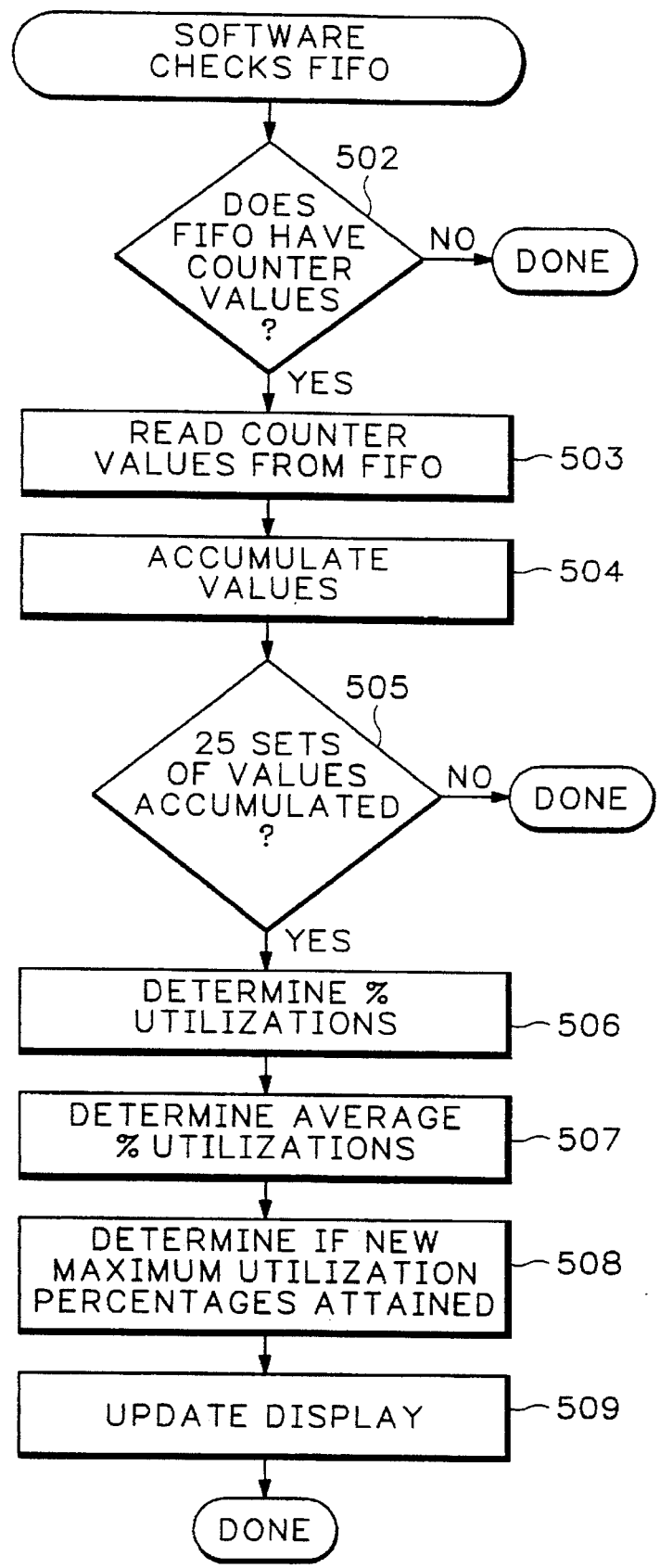

FIG. 13B is a flow chart of operational steps performed by the software in interpreting the measurement data. As often as it can, the software checks to see if counter values are available in the FIFO 102 by checking to see if the FIFO__EMPTY line 126 (FIG. 6) is false (decision block 502). If the FIFO_EMPTY line 126 is false then a set of counter values are read and accumulated from the FIFO 102 by utilizing the FIFO_READ 124 line (steps 503 and 504). The reading and accumulating steps are not necessarily synchronized with the writing of the data into the FIFO, since the writing of the data into the FIFO is accomplished by the FPGA as discussed hereinabove. Therefore, there may be more than one set of data available in the FIFO to be read, especially if the processor is busy with another task and the software is unable to immediately perform the FIFO reading task. Upon reading and accumulating twenty-five sets of counter values (decision block 505), the software performs calculations for displaying the data to the user. Twenty-five sets of counter values represents one second of data collected. The percent utilization of each category of frame classification is determined in step 506. Percent utilization (Util %) is calculated by adding up the bandwidths from each category over one second and dividing that sum by the potential bandwidth in a second. All values are in bytes. Each second the percent utilization of the network is determined as follows:

$$\frac{(BW\ of\ Loc\ Coll) + (BW\ of\ Rem\ Coll) + (BW\ of\ Ghosts) + (BW\ of\ Others)}{1,250,000}$$

where:

BW is bandwidth or the number of bytes of that frame type that occurred during that second.

Loc Coll refers to local collisions.

Rem Coll refers to remote collisions.

Ghost refers to ghost frames.

Others refers to all other frames.

$$1,250,00\ bytes = \frac{10,000,000\ bits}{second} \times \frac{1\ byte}{8\ bits} \times 1\ second$$

10,000,000 bits per second is the data transfer speed of the Ethernet station. The percent utilizations for local collisions, remote collisions and ghosts are calculated by dividing their respective bandwidths by the total bandwidth used.

If TOTALBW=(BW of Loc Coll)+(BW of Rem Coll)+(BW of Ghosts)+(BW of Others) then:

$$\%\ Util\ Loc\ Coll = \frac{BW\ of\ Loc\ Coll}{TotalBW}$$

$$\%\ Util\ Rem\ Coll = \frac{BW\ of\ Rem\ Coll}{TotalBW}$$

$$\%\ Util\ Ghost = \frac{BW\ of\ Ghosts}{TotalBW}$$

Following step 506, the averages of utilization are determined to provide indication of the average usages and errors over a given measurement period (step 507), whereupon a determination is made in step 508 if any new maximum usage or error usage percentages have been attained. If so, then the respective new maximum values are saved for future use (e.g. in display step 509). Finally, in step 509 the various values are displayed (e.g. on display 36 of FIG. 3). An example display format is discussed hereinbelow with reference to FIG. 14. The software which receives the data from FIFO 102 and calculates the percent usages, averages and the like is suitably initiated by polling the FIFO 102 and finding counter values therein. The software is then operated as discussed hereinabove to retrieve the current data in the FIFO and perform the calculations based on the data currently in the FIFO. A corresponding group of software receives and dispatches frame data with LAN controller 64 to enable the instrument to function as a station on the network, sending and receiving frame data. With reference to the total number of frames during the second interval, the count for each type represents the number of frames of that type that occurred during that second. Also shown is the total number of frames of that type since the measurement started and the average number of frames and utilization percentages.

Figure 14:
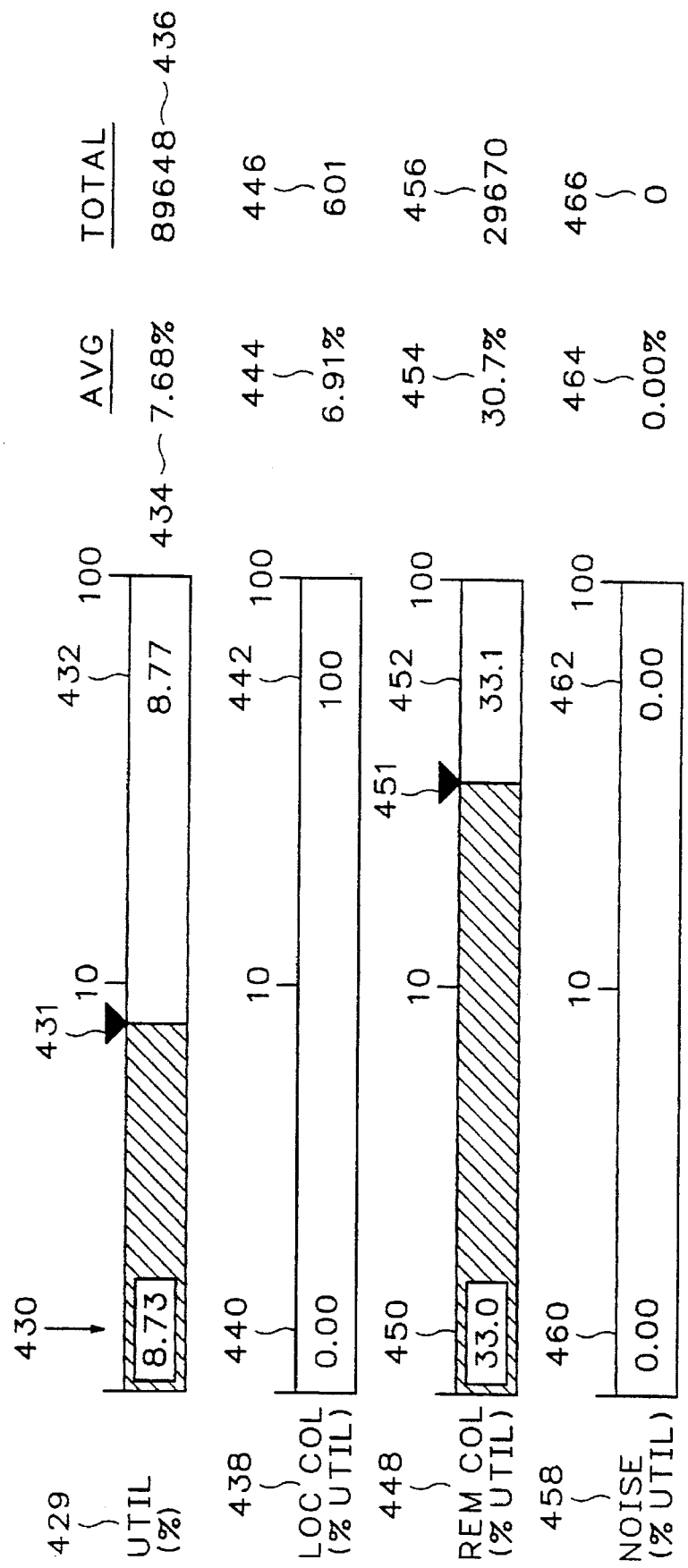
FIG. 14 is an example of a display format for showing measurement statistics.

FIG. 14 illustrates an example of a display format employed in accordance with the present invention for showing the results of measurement statistics. In FIG. 14, a bar chart format is employed wherein a first horizontal bar 430 shows the percent utilization of the network (8.73% in the illustrated example). Also displayed is the maximum value that has been attained during the current measurement, in the present case, 8.77% shown at 432. An indicator arrow 431 and shaded area provide a graphic illustration in the form of a bar chart (on a logarithmic scale) of the network utilization. To the right of the bar chart is displayed the average utilization 434, 7.68% in the illustrated example, while further to the right is displayed the total number of frames of data 436. In the present example, the number of frames that have been observed since this measurement began is 89,648. Below the utilization bar chart is the local collision percent utilization 438. In the present example, no local collisions have been observed during the last second, indicated by the 0.00 in the bar chart at 440, while the maximum local collision utilization percentage that occurred during any one second of the measurement period is 100% at 442. The average is displayed to the right at 444, being 6.91% in the present example. A total number of collision frames that have been observed during the measurement period are shown at 446, 601 frames. Still, further below the local collision bar graph is the remote collision display portion 448. In the present example, in the last second 33.0% of the utilized bandwidth has been consumed by remote collisions (illustrated numerically at 450 and via shaded bar chart and pointer 451) while the maximum number of remote collisions observed during any one second in the measurement period has been 33.1% (illustrated at 452). The average remote collision utilization is 30.7% of the bandwidth (illustrated at 454) while the total number of frames having been classified as remote collision frames is 29,670 as illustrated at 456. Displayed below the remote collision bar chart is the noise (or ghost) bar chart 458 which illustrates that no ghosts (or noise) have been observed (0.0% at 460) during the last second and that during the entire measurement period, the maximum percent utilization by ghost or noise frames has been 0.0% as illustrated at 462. Accordingly, the average is also 0.0% at 464 as well as the count of the total number of frames determined to be noise or ghost frames which is 0 (illustrated at 466). As noted, a graphic component is also employed in each bar chart to illustrate the percentages graphically on a logarithmic scale.

Accordingly, an improved instrument is provided which generates accurate measurements of collisions and ghost events on an Ethernet network, providing collision bandwidth analysis measurements as well as detection of ghost frames. The instrument suitably provides measurement of the network bandwidth used by the collisions as well as breakdown of the type of collisions, local or remote. Similar frequency and duration information about ghosts is also measured and reported.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A network analyzer for performing analysis of an active network, wherein the network comprises multiple stations interconnected by a data link, comprising:

means for connecting the network analyzer to the data link as a station node;

a receiver for receiving data traffic from the data link; and an analysis means for analyzing the received data traffic and for characterizing the received data traffic to provide information regarding network events, said analysis means comprising characterization means for characterizing the received data traffic into categories for reporting, wherein said characterization means categorizes the received data traffic as ghosts, local collisions, remote collisions or other category types, wherein said analysis means performs noise analysis for detecting and measuring the network response to noise and includes:

carrier detection means for determining the beginning of carrier on the data link, counter means for counting the amount of data passing on the data link after said carrier detection means senses the beginning of carrier, and start preamble detector means for detecting the presence or absence of a valid start preamble in the data passing on the data link, wherein said analyzer characterizes noise data on the network when said start preamble detector detects the absence of a valid start preamble in the noise data.

2. The network analyzer according to claim 1 further comprising:

a CPU means, a FIFO memory means for receiving characterization data from the analysis means, wherein said CPU means reads the characterization data from the FIFO means for further analysis and reporting.

3. The network analyzer according to claim 1 wherein said analysis means detects remote collisions that may occur during a preamble portion of data traffic.

4. A network analyzer according to claim 1 wherein the network analyzer is adapted to enable physical connection and disconnection of the network analyzer to and from the network by a user at a location on the network selected by the user.

5. A network analyzer according to claim 1 wherein said characterization means derives a single type error characterization for a single error data traffic set in a one to one mapping relation.

6. A network analyzer adapted for connecting to a network at a station node thereof comprising:

a ghost frame detector; and a byte counter for counting the number of bytes or byte times occupied by a detected ghost frame, wherein said ghost frame detector includes:

a carrier detector to determine the beginning of a carrier on the network, a counter to count the amount of data passing on the network after said carrier detector senses the beginning of the carrier on the network, and a start preamble detector for detecting the presence or absence of a valid start preamble in the data passing on the network after the beginning of carrier, wherein said analyzer characterizes noise data on the network when said start preamble detector detects the absence of a valid start preamble on the network.

7. The network analyzer according to claim 6 further comprising memory means for accumulating the number of ghost frames detected during a time period and the accumulated number of bytes or byte times occupied by the detected ghost frames during the time period.

8. A method of performing network analysis on a network comprising the steps of:

detecting the presence of ghost frames on the network at a station node thereof, wherein said detecting step comprises detecting a network response to noise by detecting the start of carrier on the network and detecting the absence of a valid network data preamble in the network response to noise; and gathering statistical information about detected ghost frames.

9. The method according to claim 8 wherein said gathering step comprises the substeps of:

determining the length of an individual ghost frame; and storing an accumulated count of determined lengths of ghost frames during a time period.

10. The method according to claim 9 further comprising the step of determining the network bandwidth consumed by ghost frames.

11. The method according to claim 8 further comprising the step of displaying statistical information for interpretation by a user.

12. A method of performing network analysis on a network for detecting network response to noise, comprising the steps of:

detecting the presence of frame data on the network, said detecting step comprising the substep of classifying the detected frame data as being among a predetermined set of event types; and gathering statistical information about detected frame data, said gathering step comprising the substeps of accumulating a count of frame data in each set of the predetermined set of event types, and accumulating a count of determined lengths of frame data in each set of the predetermined set of frame event types, wherein said set of frame event types comprises ghost frames, remote collision frames and local collision frames, and wherein said detecting step comprises detecting and counting frame data which is free of a valid network data preamble.

13. The method according to claim 12 wherein said step of gathering statistical information about detected frame data comprises determining the network bandwidth consumed by the frame data.

14. The method according to claim 13 further comprising the step of displaying statistical information about detected network response to noise for interpretation by a user.

15. The method according to claim 12 wherein said detecting step detects remote collisions that may occur during a preamble portion of a frame on the network.

* * * * *